United States Patent
Oeda et al.

(10) Patent No.: US 6,311,236 B1
(45) Date of Patent: Oct. 30, 2001

(54) MAGNETIC DISC CONTROL APPARATUS WITH PARALLEL DATA TRANSFER BETWEEN DISC CONTROL UNIT AND ENCODER CIRCUIT

(75) Inventors: Takashi Oeda; Motoyasu Tsunoda; Noriyuki Karasawa, all of Yokohama; Yukihito Takada, Kamakura; Satoshi Kawamura, Yokohama; Yoshio Yukawa, Kanagawa-ken; Tsuneo Hirose; Mitsuru Kubo, both of Odawara, all of (JP)

(73) Assignees: Hitachi, Ltd., Tokyo; Hitachi Video Engineering, Incorporated, Yokohama, both of (JP)

( * ) Notice: Subject to any disclaimer, the term of this patent is extended or adjusted under 35 U.S.C. 154(b) by 0 days.

(21) Appl. No.: 09/503,248

(22) Filed: Feb. 14, 2000

Related U.S. Application Data

(63) Continuation of application No. 09/055,942, filed on Apr. 7, 1998, now Pat. No. 6,125,427, which is a continuation of application No. 08/199,988, filed on Feb. 22, 1994, now Pat. No. 5,737,632, which is a continuation of application No. 07/630,236, filed on Dec. 19, 1990, now abandoned.

(30) Foreign Application Priority Data

Dec. 19, 1989 (JP) .................................................. 1-328925
Dec. 25, 1989 (JP) .................................................. 1-332931

(51) Int. Cl.[7] ........................... G06F 13/28; G06F 13/32; G06F 13/42; G11B 15/52; G11B 20/12
(52) U.S. Cl. ................................ 710/34; 710/61; 710/33; 711/111; 711/112; 369/48
(58) Field of Search .................................. 369/32, 47, 48, 369/111; 711/109, 134, 114, 147, 112, 4, 144, 155, 156, 150, 151, 111, 149, 168, 216, 169, 209; 386/111, 112; 360/32, 331; 710/34, 33, 35, 22, 30, 28, 31, 53, 56, 61, 65; 712/300, 247, 248

(56) References Cited

U.S. PATENT DOCUMENTS

| | | | |
|---|---|---|---|
| 3,675,209 | 7/1972 | Trost et al. | 395/825 |
| 3,771,143 | 11/1973 | Taylor | 360/25 |
| 4,413,251 | 11/1983 | Adler et al. | 340/347 |

(List continued on next page.)

FOREIGN PATENT DOCUMENTS

| | | |
|---|---|---|
| 51-65912 | 6/1976 | (JP) . |
| 58-3113 | 1/1983 | (JP) . |
| 58-133062 | 8/1983 | (JP) . |

(List continued on next page.)

*Primary Examiner*—Daniel H. Pan
(74) *Attorney, Agent, or Firm*—Antonelli, Terry, Stout & Kraus, LLP

(57) ABSTRACT

A data processing method of recording data on a recording medium mounted on an information recording apparatus. The data processing method includes the steps of dividing, in a disk controller, parallel data constituted by p bits transferred from a high-rank device into data each having q bits, where p and q are numbers; transferring the data each having q bits from the disk controller to an encoder as parallel data constituted by q bits; encoding, in the encoder, the data each having q bits to generate recording signals corresponding to data to be recorded; and recording the recording signals on the recording medium, thereby recording the data to be recorded on the recording medium. The data processing method may further include the steps of reproducing, from the recording medium, the recording signals recorded on the recording medium; decoding, in a decoder, the reproduced recorded signals to generate data each having p bits; transferring the data each having p bits from the decoder to the disk controller as parallel data constituted by p bits; and converting, in the disk controller, the data each having p bits into parallel data constituted by m bits to be transferred to the high-rank device, where m is a number.

6 Claims, 23 Drawing Sheets

U.S. PATENT DOCUMENTS

| | | | |
|---|---|---|---|
| 4,434,487 | 2/1984 | Rubinson et al. | 371/10.2 |
| 4,494,215 * | 1/1985 | Koike et al. | 711/114 |
| 4,584,616 | 4/1986 | Allen | 360/48 |
| 4,631,723 | 12/1986 | Rathbun et al. | 371/10.2 |
| 4,688,016 | 8/1987 | Fok | 341/59 |
| 4,706,136 | 11/1987 | Wentzel et al. | 360/39 |
| 4,796,113 | 1/1989 | Hayakawa | 371/10.2 |
| 4,809,091 | 2/1989 | Miyazawa et al. | 360/48 |
| 4,903,198 | 2/1990 | Iwasaki | 395/575 |
| 4,916,558 | 4/1990 | Nishimura et al. | |
| 4,949,326 | 8/1990 | Takagi et al. | 369/54 |
| 4,984,230 | 1/1991 | Satoh et al. | 369/54 |
| 4,986,668 | 1/1991 | Fukushima et al. | 369/59 |
| 4,996,678 * | 2/1991 | Maeda | 369/32 |
| 5,028,922 | 7/1991 | Huang | 341/59 |
| 5,056,010 | 10/1991 | Huang | 395/425 |
| 5,084,789 | 1/1992 | Kamo et al. | 360/53 |
| 5,109,500 | 4/1992 | Iseki et al. | 395/425 |
| 5,127,088 | 6/1992 | Takaki | 395/275 |
| 5,202,979 | 4/1993 | Hillis et al. | 395/575 |

FOREIGN PATENT DOCUMENTS

| | | |
|---|---|---|
| 60-183642 | 9/1985 | (JP) . |
| 61-145767 | 7/1986 | (JP) . |
| 6476563 | 3/1989 | (JP) . |
| 1-91375 | 4/1989 | (JP) . |
| 1-171160 | 7/1989 | (JP) . |
| 1-264316 | 10/1989 | (JP) . |
| 2-103781 | 4/1990 | (JP) . |

* cited by examiner

MAGNETIC DISC CONTROL APPARATUS WITH PARALLEL DATA TRANSFER BETWEEN DISC CONTROL UNIT AND ENCODER CIRCUIT

CROSS-REFERENCES TO RELATED APPLICATIONS

This application is a continuation of application Ser. No. 09/055,942 filed on Apr. 7, 1998, now U.S. Pat. No. 6,125,427, which is a continuation of application Ser. No. 08/199,988 filed on Feb. 22, 1994, now U.S. Pat. No. 5,737,632, which is a continuation of application Ser. No. 07/630,236 filed on Dec. 19, 1990, now abandoned.

BACKGROUND OF THE INVENTION

The present invention relates to a magnetic disc apparatus for use in an information processing apparatus such as a computer, and more particularly, to a magnetic disc apparatus including an LSI (large-scale integrated circuit) for a magnetic disc apparatus which is capable of performing high speed read and write operations by parallelly reading and writing data from and to the magnetic disc apparatus, as well as effectively utilizing recording surfaces of magnetic discs by selecting a spare track or a spare sector in place of a defective track or a defective sector on the magnetic disc.

A conventional magnetic disc apparatus known as a parallel read and write type is described in Japanese Patent Application Laid-Open Publication No. 61-145767, which divides data belonging to a single sector on a data recording surface to simultaneously record the divided data in parallel, and simultaneously reads data recorded on respective data recording surfaces in parallel and synthesizes the same to data in sector units to thereby increase a data transfer speed.

As a counterpart of the above-mentioned parallel read and write type magnetic disc apparatus, there is a serial read and write type magnetic disc apparatus whose internal structure is shown in a block diagram of FIG. 17.

In FIG. 17, reference numeral 1 designates a host computer, 2 a magnetic disc apparatus, 3 a host interface control unit, 4 a buffer memory, 5 a disc control unit, 6 a microprocessor, 8 a recording and reproducing unit, 9 an encoder/decoder circuit, 11 a head circuit, 14 a parallel interface.

When a parallel data of, for example, eight bits is supplied from the host computer 1 through the parallel interface 14, the parallel data is delivered in the magnetic disc apparatus 2 from the host interface control unit 3 to the disc control unit 5 where the parallel data is parallel-to-serial converted. The serially converted data is written one bit by one bit on a recording surface of a magnetic disc, not shown, through the encoder/decoder circuit 9 by the head circuit 11 as serial data. On the other hand, data serially read one bit by one bit is delivered through the encoder/decoder circuit 9 to the disc control unit 5. The disc control unit 5 converts the serial data to a parallel form, and this parallel data is transferred to the host computer 1 through the host interface control unit 3 and the parallel interface 14.

FIG. 18 is a block diagram showing the disc control unit 5 as shown in FIG. 17 in detail.

In FIG. 18, reference numeral 24 designates a MPU (microprocessor unit) interface unit, 25 a host interface control unit, 7b a parallel-to-serial conversion unit, 27 a drive control unit, and 28 an ECC unit for detecting and correcting data errors. It will be appreciated that a serial data transmission path is established by data transmission paths from the parallel-to-serial conversion unit 7b to the drive control unit 27 and the ECC unit, and from the drive control unit 27 to the encoder/decoder unit 9 and thereafter.

FIG. 19 is a block diagram showing an internal structure of a conventional parallel read and write type magnetic disc apparatus. A magnetic disc apparatus 2 shown in this drawing comprises a plurality of disc-shaped recording surfaces constituting a single cylinder and read and write heads respectively corresponding to the respective recording surfaces, as shown in FIG. 20. When a disc control unit 5 receives m-bit parallel data from a host computer 1, the m-bit parallel data is output from disc control unit 5 as m-bit serial data on a single path (see FIG. 18). The m-bit serial data on a single path is converted into (m/2)-bit serial data on two paths to form two data trains by a single serial path to plural serial path conversion unit 7. The two data trains outputted as the results are encoded by the encoder/decoder circuit 9, and then they are assigned to two heads selected from a plurality of heads (by a head circuit 11). These two data trains are parallelly written on two disc-shaped recording surfaces corresponding to the selected two heads. On the other hand, when data is read from recording surfaces, two data trains are parallelly read from two disc-shaped recording surfaces corresponding to two heads. The read data trains are decoded converted from (m/2)-bit serial data on two paths to m-bit serial data on a single path, and then integrated to m-bit parallel data by the disc control unit 5 and outputted to the host computer 1.

FIG. 20 is a lateral view showing a structure of magnetic discs and heads in the magnetic disc apparatus in FIG. 19.

In this drawing, five recording discs 51 are concentrically supported to constitute a cylinder, wherein the upper surface and the lower surface of each disc respectively constitute recording surfaces. Specifically, the upper surface and the lower surface of the respective five recording discs 51 are utilized as recording surfaces, so that there is a total of ten recording surfaces which correspond to a servo surface 52 and first to ninth data recording surfaces 53-1 to 53-9. Also, ten heads H are provided for the respective recording surfaces so as to be associated with one another.

FIG. 21 is a block diagram showing a circuit arrangement of the recording and reproducing unit 8 of the conventional magnetic disc apparatus shown in FIG. 19 in a data write operation.

In FIG. 21, the encoder/decoder unit 9 is shown as comprising n encoder circuits 16 while the head circuit 11 is shown as comprising n head amplifiers 17 and n heads 18 when writing data. If 2-bit parallel data is to be written, n is naturally 2. Reference numeral 15 designates a write clock generating circuit, 19 an NRZ (Non-Return to Zero) signal.

FIG. 22 is a block diagram showing a circuit arrangement of the recording and reproducing unit 8 of the conventional disc apparatus shown in FIG. 19 when data is read.

In FIG. 22, the encoder/decoder unit 9 is shown as comprising n decoder circuits 22 and n waveform shaper circuits 23, and the head circuit is shown as comprising n head amplifiers 17 and n heads 18 when, upon reading data. However, as mentioned above, if 2-bit parallel data is to be read, n is naturally 2. Reference numeral 21 designates a phase synchronizing circuit.

The above-mentioned prior art is useful in achieving a high speed data transfer by performing parallel write and read operations. However, it does not consider a combination of data recording surfaces on which data divided from parallel data are to be stored, which results in always providing fixed combinations of the recording surfaces for a simultaneous read or write operation. For this reason, the prior art implies problems in a decrease of a storage capacity due to defective recording surfaces, which is remarkably important in a parallel read and write operation, and a deterioration in a data transfer speed caused by reassignment of spare tracks and spare sectors in place of defective tracks and defective sectors.

For example, as shown in the previously explained FIG. 20, in the magnetic disc apparatus of a dedicated servo system or a servo system using a servo surface employing five recording discs 51, assume that a two-bit parallel recording is performed where parallel data transferred from the host computer 1 is divided into two data trains, and a write or read operation of the two data trains is simultaneously carried out by the use of two data recording surfaces.

As shown in FIG. 20, nine out of ten recording surfaces are used as data recording surfaces (data recording surfaces 53-1 to 53-9). Therefore, if two surfaces are fixedly combined to be one unit for the two-bit parallel recording, one data recording surface inevitably remains unused and cannot be utilized for reading and writing data.

If the recording surfaces for the two-bit parallel recording are made by combinations of the data recording surfaces 53-1 and 53-2, 53-3 and 53-4, 53-5 and 53-6, and 53-7 and 53-8, the data recording surface 53-9 cannot be used for writing and reading data and remains unused.

On the above-mentioned occasion, referring to FIG. 33, assume that a track on the data recording surface 53-6 on a cylinder 57 is a defective track 56. Since the two-bit parallel recording simultaneously writes and reads on and from two data recording surfaces, if a defective track exists on either of the two recording surfaces and read and write operations are impossible thereon, read and write operations cannot be performed on a track on the non-defective recording surface.

In the case of FIG. 23, since a track on the data recording surface 53-6 is the defective track 56, even if a track on the data recording surface 53-5 is normal, the data recording surface 53-5 cannot be used. On such an occasion, a combination of two tracks, one of which is defective, should be replaced by or reassigned to a previously prepared combination of two spare tracks on a spare cylinder 61, as shown in FIG. 23.

Although there are two non-defective tracks (the data recording surfaces 53-5 and 53-9) on the same cylinders, since the combination of recording surfaces is fixed, the above free tracks (the data recording surfaces 53-5 and 53-9) cannot be combined, and previously combined two tracks determined as spare tracks should be used, which results in an extremely low efficiency and a cause of decrease in the storage capacity.

In this example, the two-bit parallel recording has been explained. If the number of bits constituting a parallel data train is increased (for example an eight-bit parallel recording), this tendency is further worsened. Specifically, in the eight-bit parallel recording, if one of eight tracks for storing data is defective, the remaining seven tracks cannot be used for writing and reading data.

Furthermore, in spite of the fact that the parallel recording is employed for a high speed data transfer, a defective track, if it exists, requires a seek operation for reassigning a spare track, whereby the above-mentioned high speed transfer may not be achieved. In the above explanation, the parallel recording has been assumed to be performed in track units, and the same result is derived if it is performed in sector units as shown in FIG. 24. To be specific, a spare sector area 59 used in place of a defective sector should be prepared in each track, and a reassignment requires a rotation delay for rotating the disc from a defective sector 58 to the spare sector area 59.

The above explanation has been made based on the assumption that there is at most one defective track in a single cylinder. Practically, it is rare that two or more defective tracks exist in a single cylinder.

Further, data transfer and reception between the disc control unit 5 and the encoder/decoder circuit 9, as shown in FIG. 17, are performed by two serial data to be read and written. For this reason, a disc control LSI employed in the disc control unit 5 is provided for each of serial data interfaces for read and write, wherein each data is treated as serial data.

Therefore, if a disc control is to be fulfilled by a single LSI, data between the disc control LSI and the encoder/decoder circuit 9 should be serial data, whereby a data transfer speed cannot be sufficiently increased.

On the other hand, if a plurality of disc control LSI are employed, a processing performed by a micro-processor for controlling the disc control LSIs is excessive, which results in a large size of hardware, a difficulty in reducing size and providing a larger storage capacity, and an increase in cost.

SUMMARY OF THE INVENTION

It is an object of the present invention to provide a magnetic disc control apparatus which is adapted to arrange data to a plurality of data trains so as to prevent a decrease in a storage capacity due to a defective track or sector which is extremely important for parallelly writing respective data trains on a plurality of recording surfaces of a magnetic apparatus.

It is another object of the present invention to provide a magnetic disc control apparatus capable of preventing a drop in a data transfer speed by suppressing to zero a time period required to replace a defective track or sector with a spare track or a spare sector.

It is a further object of the present invention to provide an LSI for a magnetic disc apparatus capable of parallelly transferring write and read data to and from the magnetic disc apparatus and accordingly increasing a data transfer speed.

It is a further object of the present invention to provide an information processing system employing a single LSI for a magnetic disc apparatus capable of parallelly transferring data.

A first feature of the present invention is to provide a selection unit for an n-bit parallel write and read type magnetic disc apparatus wherein data is written on or read from n disc-shaped recording surfaces corresponding to n heads, wherein if a defective track or a defective sector exists in any of the n disc-shaped recording surfaces, one is selected from the remaining nine disc-shaped recording surfaces except for the one having the defective track or sector, a track or a sector on the selected recording surface is employed as a spare track or a spare sector, and a head corresponding to this spare track or spare sector is selected to write and read data on and from the spare track or the spare sector.

In the magnetic disc apparatus provided with the selection unit as mentioned above, the spare track or the sector belongs to the same cylinder as a normal track or sector on one of the remaining disc-shaped recording surfaces with which a combination is made.

When the data control unit receives m-bit parallel data to be written from an information processing apparatus, the data is divided into n data trains each comprising (m/n) bits. The data trains are parallel-to-serial converted and encoded. Thereafter, the n data trains are assigned to n heads selected from a plurality of and parallelly written on n disc-shaped recording surfaces corresponding to the n heads.

On the other hand, n data trains are parallelly read from n disc-shaped recording surfaces corresponding to n heads. The respective data trains are decoded, serial-to-parallel converted, and then integrated to m-bit parallel data and outputted.

Reference letters m, n respectively represent an integer, wherein $n \leq m$ is satisfied.

In the event of writing or reading data on or from n disc-shaped recording surfaces corresponding to n heads, if a defective track or a defective sector exists, one recording surface is selected by the selection unit from the remaining recording surfaces except for the one having the defective track or the sector area, and data is written or read on or from a corresponding spare track or spare sector by a corresponding head.

A second feature of the present invention lies in that an even number of the plurality of disc-shaped recording surfaces are provided, and the above-mentioned value n is also selected to be even, wherein one of the even number of disc-shaped recording surfaces is employed as a servo surface on which servo information for controlling positioning of the heads on the disc-shaped recording discs is written. Then, within an odd number of the remaining disc-shaped recording surfaces, one which is left unassigned when they are assigned to the above-mentioned even number n, is employed as a spare disc-shaped recording surface including a spare track or sector used in place of a defective track or a defective sector. Such a spare disc-shaped recording surface including the spare track or sector belongs to the same cylinder as the other remaining disc-shaped recording surfaces to thereby suppress to zero a time period required to reassign the spare track or sector.

A third feature of the present invention is to provide an LSI for a magnetic disc apparatus comprising a host interface unit for adjusting data inputted to and outputted from an information processing apparatus, a disc interface unit for parallelly inputting and outputting data to and from a magnetic storage apparatus and means for controlling a data transfer between both interfaces.

Also, the present invention provides an LSI for a magnetic disc apparatus comprising a host interface unit for adjusting parallel data inputted to and outputted from an information processing apparatus, a disc interface unit for parallelly inputting and outputting data to and from a magnetic storage apparatus, means for controlling a parallel data transfer between both interfaces, means for generating a code for detecting errors in transferred data for each parallel data, converting the same to parallel data having the same number of bits as the transferred parallel data and adding the converted code to the parallel data transferred from the host interface unit to the disc interface unit, and means for detecting errors in the transferred data from the code for detecting errors in the transferred data added to the parallel data transferred from the disc interface unit to the host interface unit.

A fourth feature of the present invention is to provide an information processing system comprising a buffer memory for holding parallel data, an encoder/decoder unit coupled to the buffer memory through an LSI for a magnetic disc apparatus for encoding parallel data trains to be written on recording surfaces of a disc to recording codes, and reading recording codes and decoding the same to parallel data trains, and a head circuit coupled to the encoder/decoder unit corresponding to a plurality of heads for controlling the respective heads to read and write data trains.

As mentioned above, a data line between the LSI for a magnetic disc apparatus and the encoder/decoder unit is made parallel. If the LSI includes therein even one circuit which serially processes data, data lines connecting such internal circuits are also made parallel so as to eliminate causes which may interfere with a high speed operation.

Thus, data is inputted and outputted to and from the magnetic storage apparatus in a parallel form by the disc interface unit. A data transfer between the host interface unit and the disc interface unit is also performed parallelly.

Parallel data transferred between the host interface unit and the disc interface unit is subjected to error detection. To be more specific, a code for detecting errors in transferred data is generated as parallel data (not converted to serial data), converted to parallel data having the same number of bits as the transferred parallel data and added to the parallel data transferred from the host interface unit to the disc interface unit. Thus, data errors in transferred data are detected by the code for detecting errors in transferred data added to the parallel data transferred from the disc interface unit to the host interface unit. If a data error is present, the error is corrected.

DESCRIPTION OF THE PREFERRED EMBODIMENTS

Embodiments of the present invention will hereinafter be explained based on the accompanying drawings.

Figure 1:
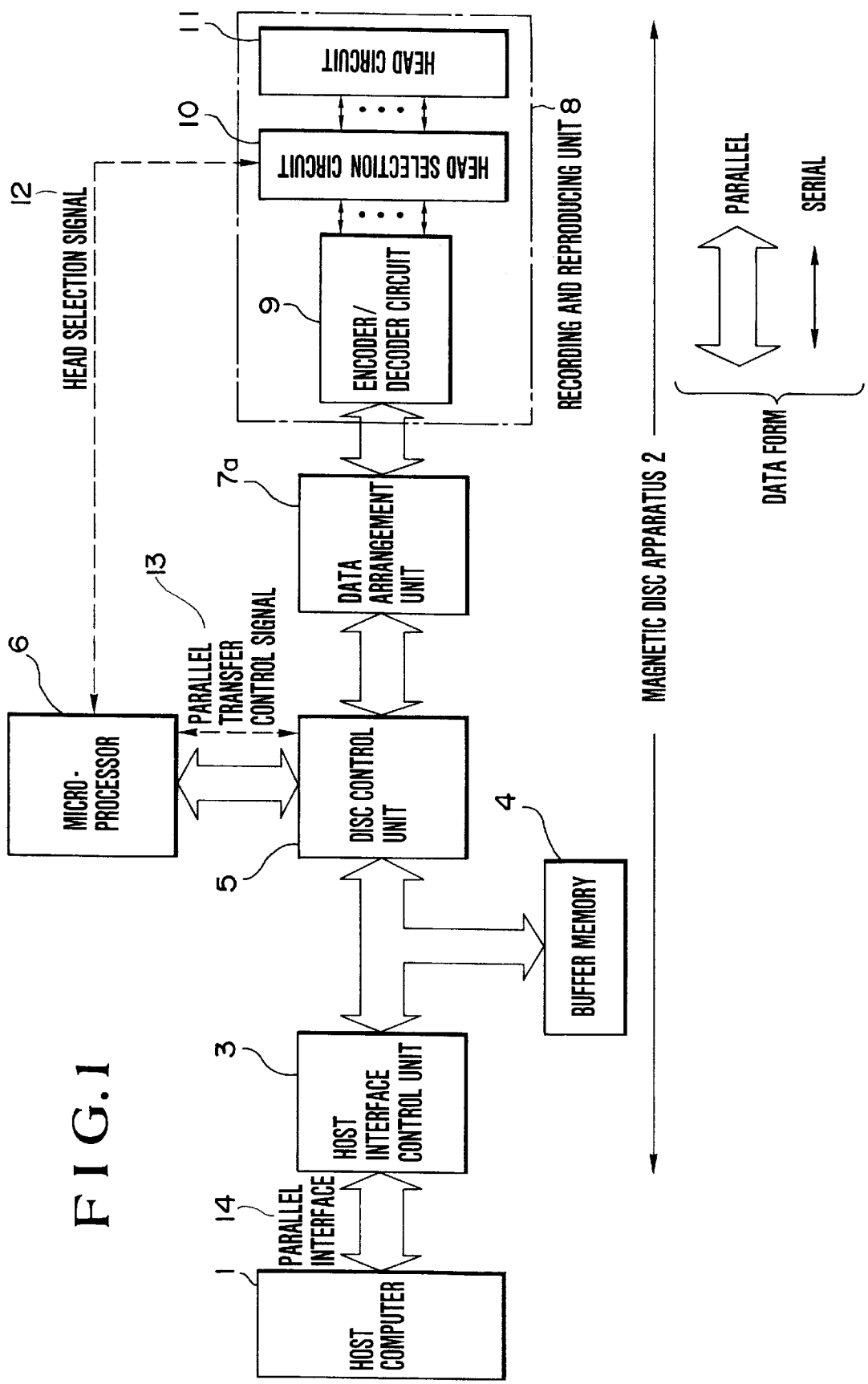
FIG. 1 is a block diagram showing a magnetic disc apparatus of a first embodiment according to the present invention.

FIG. 1 is a block diagram showing an internal structure of a magnetic disc apparatus of a first embodiment of the present invention.

As shown in this drawing, a magnetic disc apparatus 2 comprises a host interface control unit 3, a disc control unit 5, a microprocessor 6, a buffer memory 4, a data arrangement unit 7a and a recording and reproducing unit 8.

Figure 2:
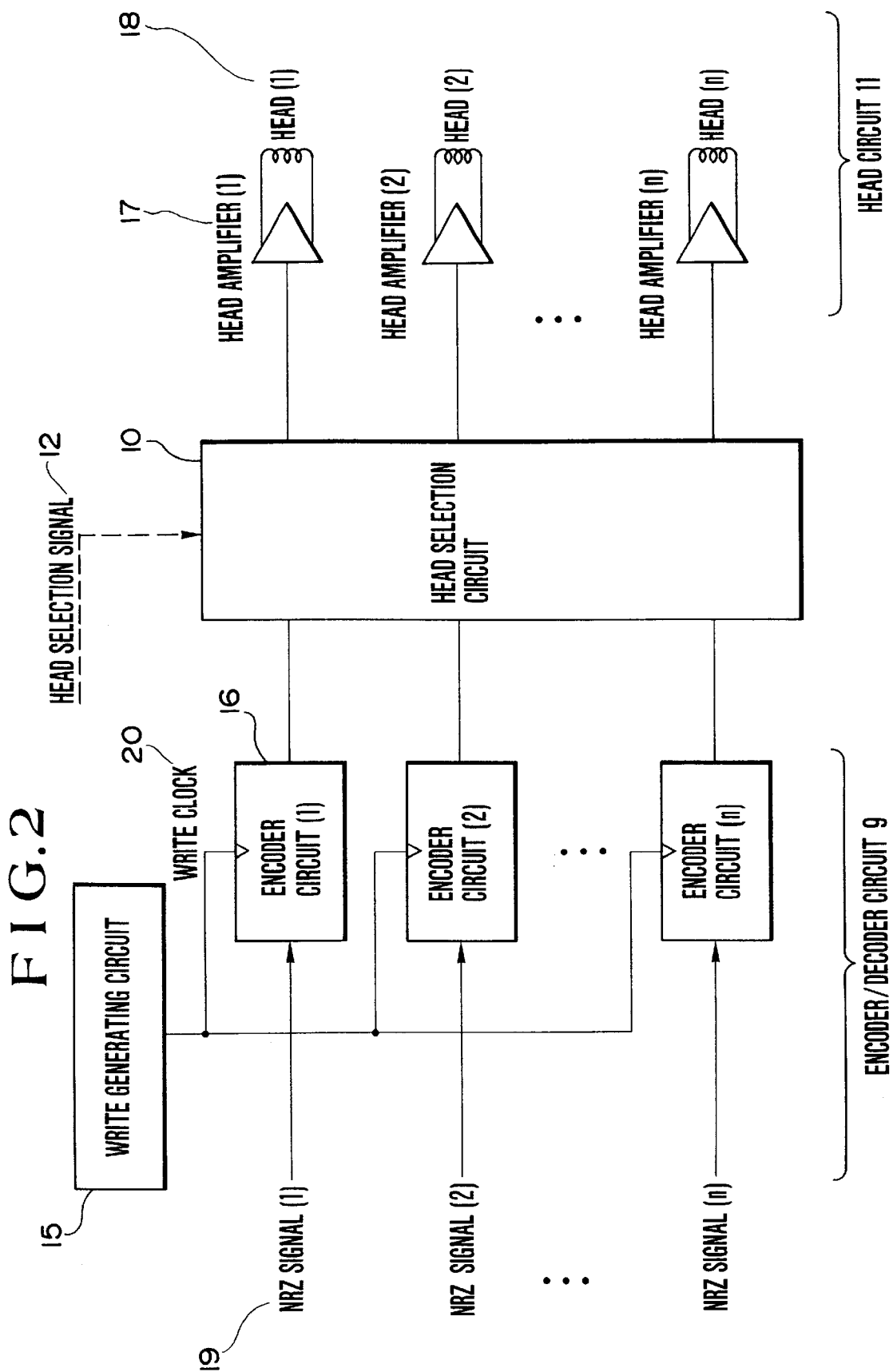
FIG. 2 is a block diagram showing a detailed structure of a recording and reproducing unit in FIG. 1 in a data write operation.

The recording and reproducing unit 8 comprises an encoder/decoder circuit 9, a head selection circuit 10 and a head circuit 11. FIG. 2 shows a structure of the recording and reproducing unit 8 in a data write operation. The encoder/decoder circuit 9 comprises a write clock generating circuit 15 and encoder circuits 16 (1 to n).

Figure 3:
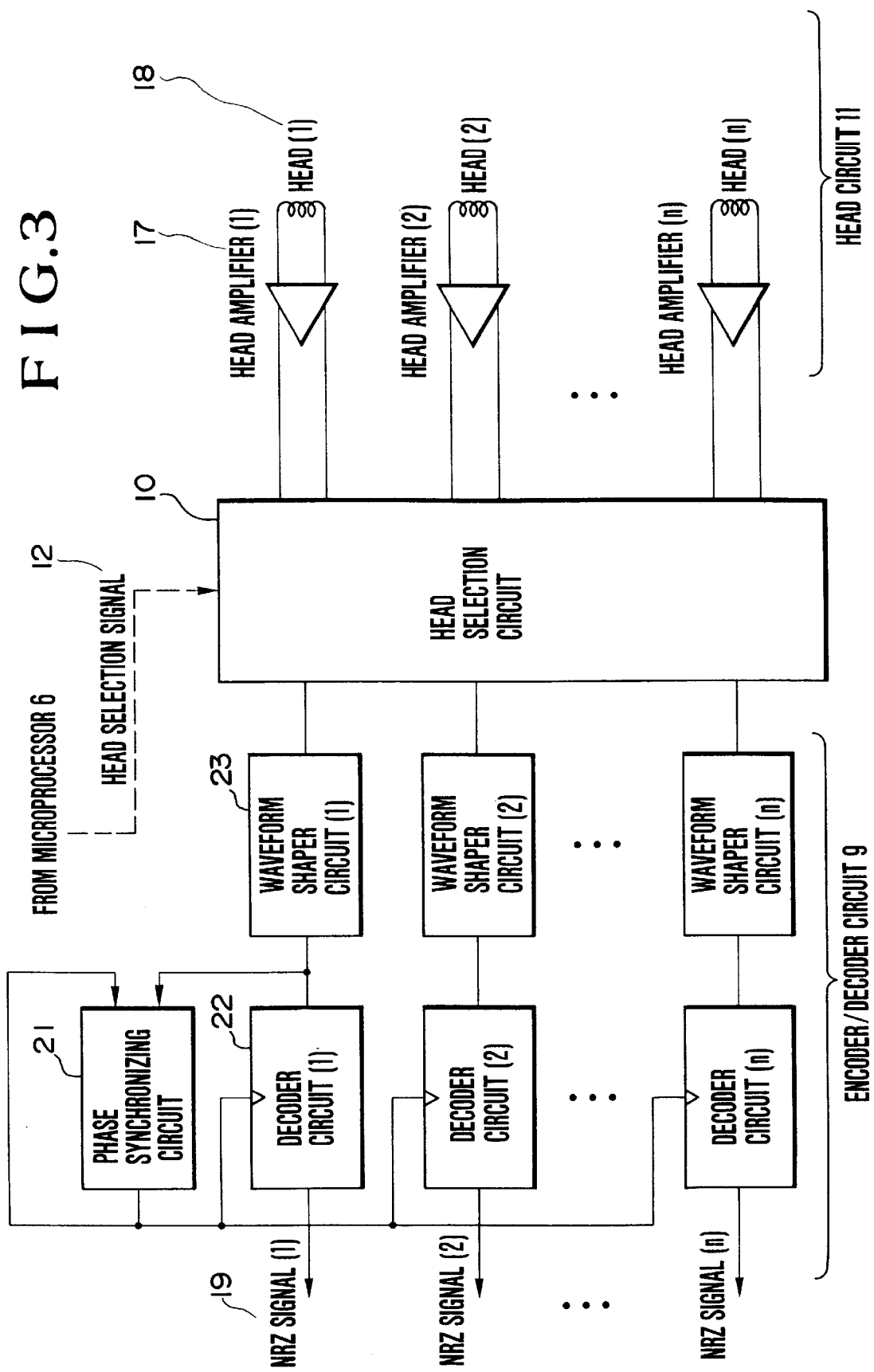
FIG. 3 is a block diagram showing a detailed structure of the recording and reproducing unit in FIG. 1 in a data read operation.

FIG. 3 shows a structure of the recording and reproducing unit 8 in FIG. 1 in a data read operation, wherein the encoder/decoder circuit 9 comprises a phase synchronizing circuit 21, decoder circuits 22 (1 to n) and waveform shaper circuits 23 (1 to n).

The head circuit 11 upon writing and reading data are formed of head amplifiers 17 (1 to n), decoder circuits 22 (1 to n) and waveform shaper circuits 23 (1 to n).

The parallel recording type magnetic disc apparatus according to the present invention divides data in each sector into n data and simultaneously writes and reads the respective divided data on and from n data recording surfaces. The n recording surfaces for storing the n divided data are selected by the head selection circuit 10, wherein a head selection signal 12 generated from the microprocessor 6 is used for selecting the heads 18 (1 to n). The head selection signal 12 is the same as head information in ID information (shown in FIG. 4) of each sector which is calculated by the microprocessor 6.

Next, before explaining a circuit structure and operation of the disc control unit 5, an example of a data format (a two-bit parallel recording, where one sector is composed of 512 bits) for the parallel recording type magnetic disc apparatus will be explained on the basis of FIG. 4.

Figure 4:
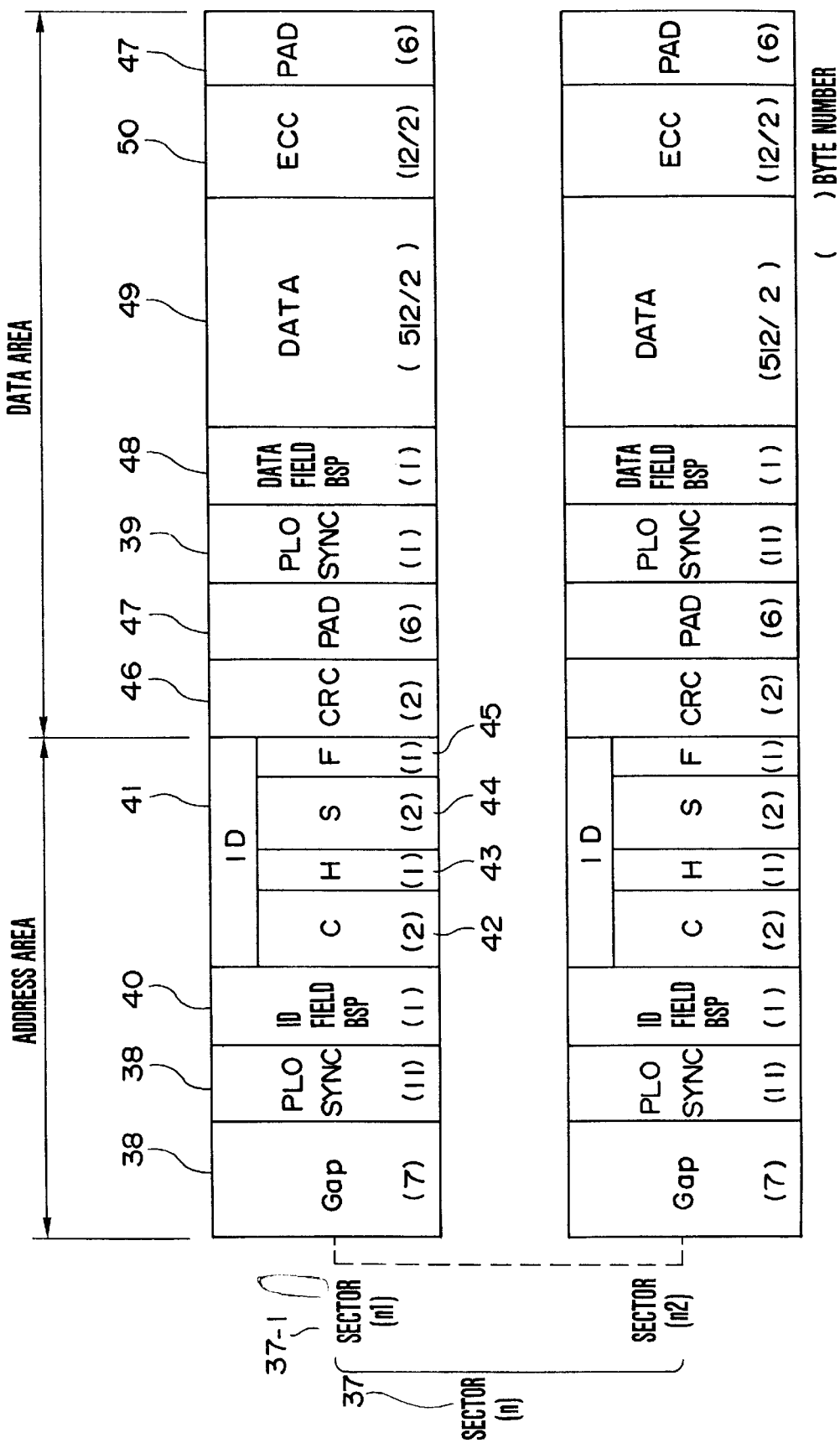
FIG. 4 is an explanatory diagram showing an example of a data format in a parallel recording type magnetic disc apparatus.

In FIG. 4, the only parallel data are DATA 49 and ECC (an error detecting and correcting code) 50, however, ID 41 and CRC (an error detecting bit) 46 can be also made parallel. However, if PLO·SYNC 39, BSP (a byte seek pattern) 40 of an ID field and BSP 48 of a DATA field are divided and parallelly written, since they are signals used for synchronization when data is read by the recording and reproducing unit 8 shown in FIG. 1, it is impossible to read them. For this reason, it is necessary to independently store such information in respective sectors 37-1 and 37-2 constituting a sector 37.

It is therefore necessary to provide different processing for the data to be divided (DATA 49, ECC 50 and so on) and the data which should not be divided in a data transfer between the disc control unit 5 and the data arrangement unit 7a.

Figure 5:
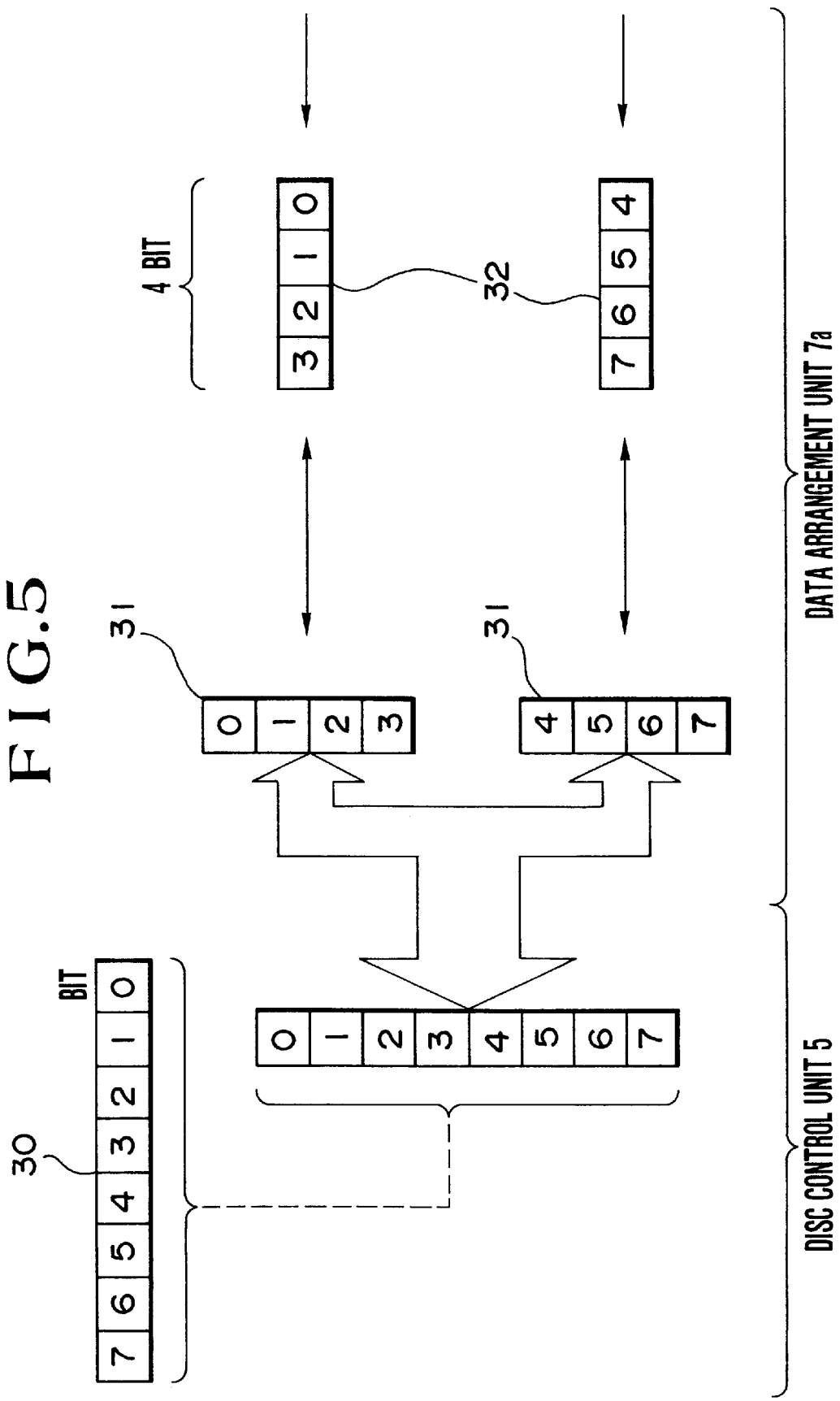
FIG. 5 is an explanatory diagram showing how a data train of data to be divided is processed.

Assuming that eight-bit parallel data is divided into two as shown in FIG. 5, an eight-bit parallel data train 30 is delivered as it is from the disc control unit 5 to the data arrangement unit 7a in one cycle. Then, it is arranged directionally to two by the data arrangement unit 7a, and respective divided data trains 31 are two parallel data trains 32.

Figure 6:
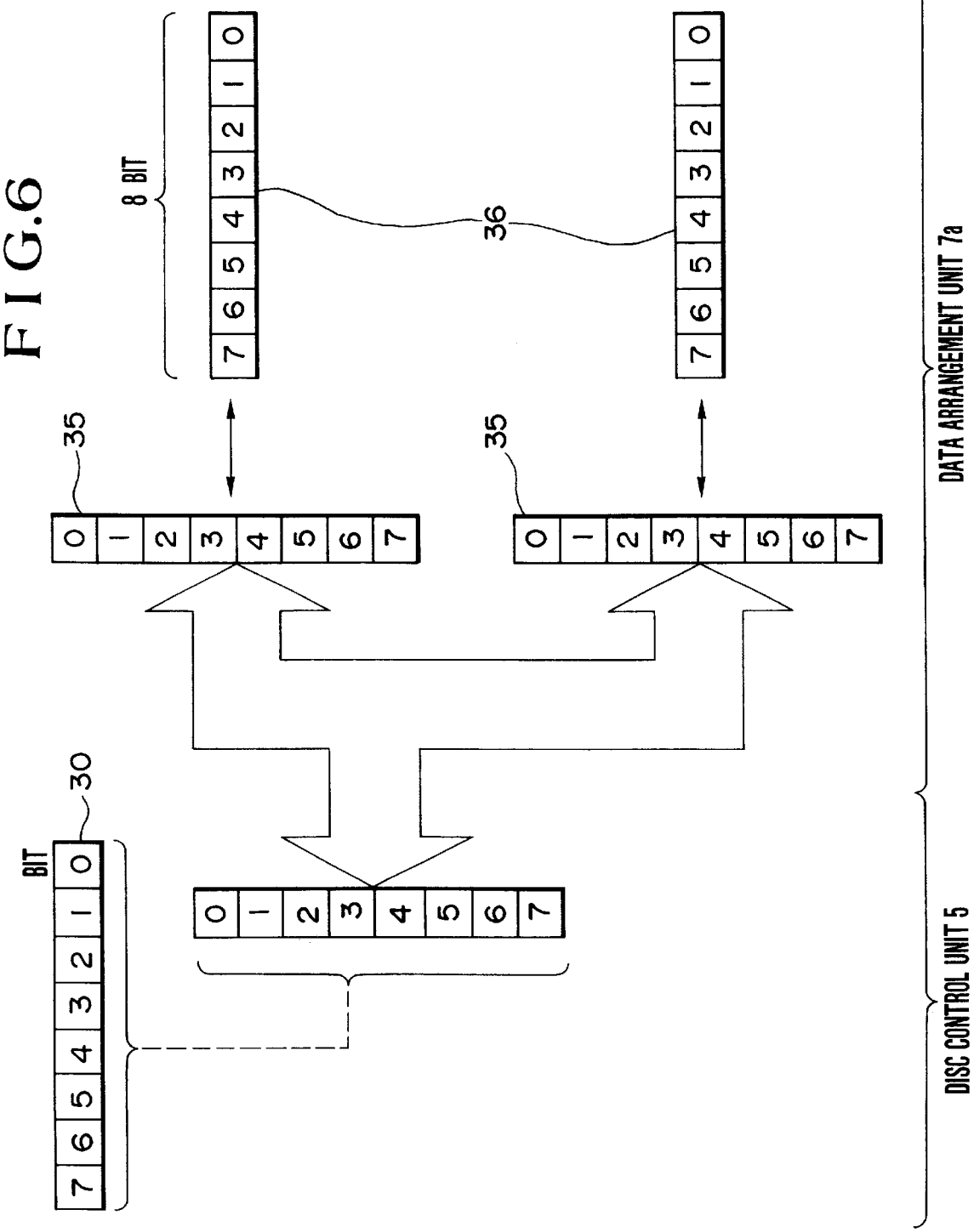
FIG. 6 is an explanatory diagram showing an undesirable method of processing a data train of data which is not to be divided.

However, if the above-mentioned data not to be divided is delivered as two directionally arranged equivalent data trains, a time period required for an eight-bit data train 36 is necessary for the non-divided data (FIG. 6), whereas a time period for a four-bit data train 32 (FIG. 5) is necessary for the arranged data, whereby a data transfer cycle of the arranged data train between the disc control unit 5 and the data arrangement unit 7a is different from that of the non-divided data.

Figure 7:
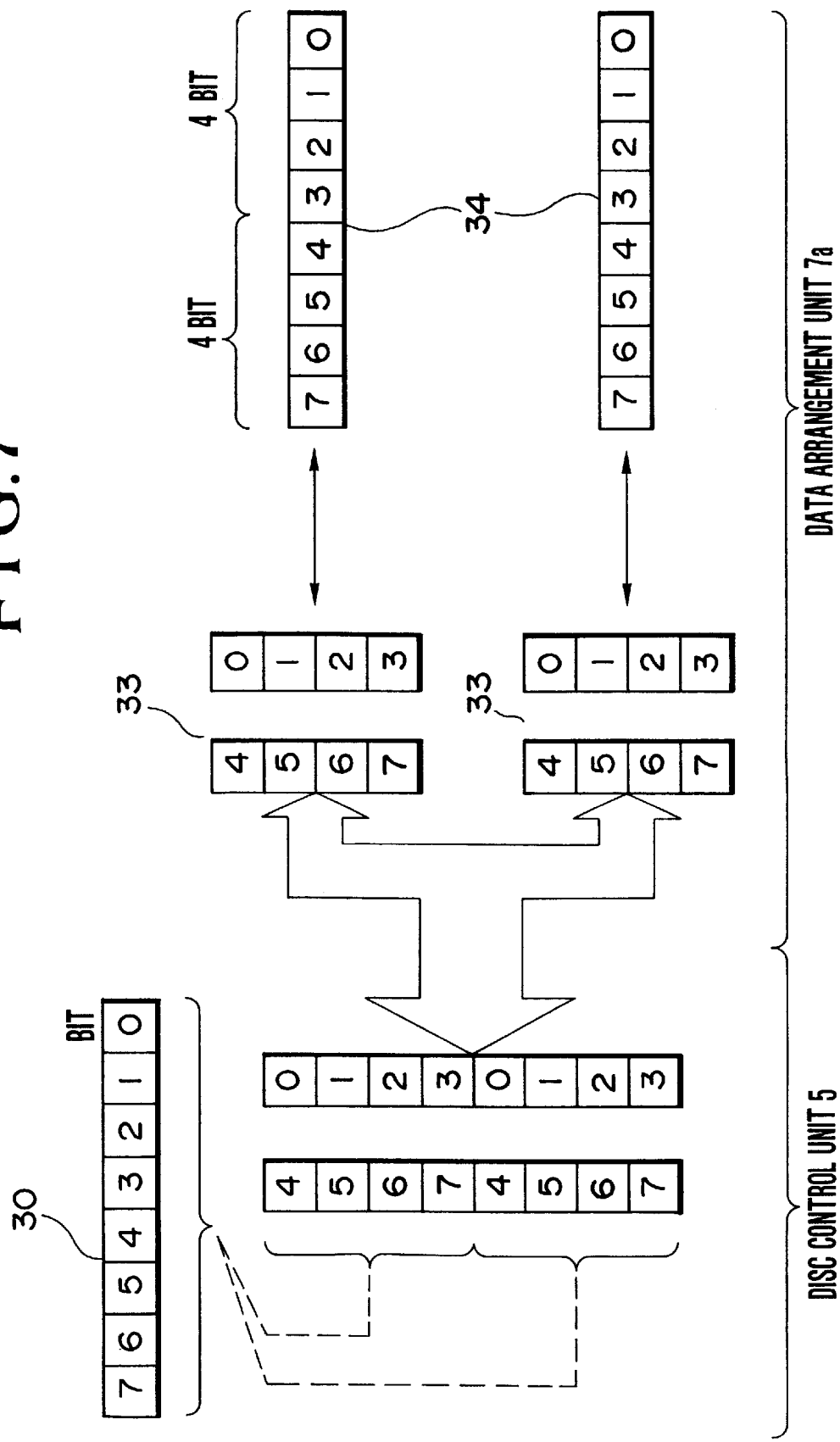
FIG. 7 is an explanatory diagram showing a desirable method of processing a data train of data which is not to be divided.

To avoid such inconvenience, the non-divided data train 30 is divided into upper and lower four-byte data trains which are respectively repeated to form two four-bit data trains (one byte) 33 and two four-bit data trains (one byte) 33, whereby the data train 30 is delivered as a totally two-byte data train 33 in two cycles, as shown in FIG. 7.

Figure 8:
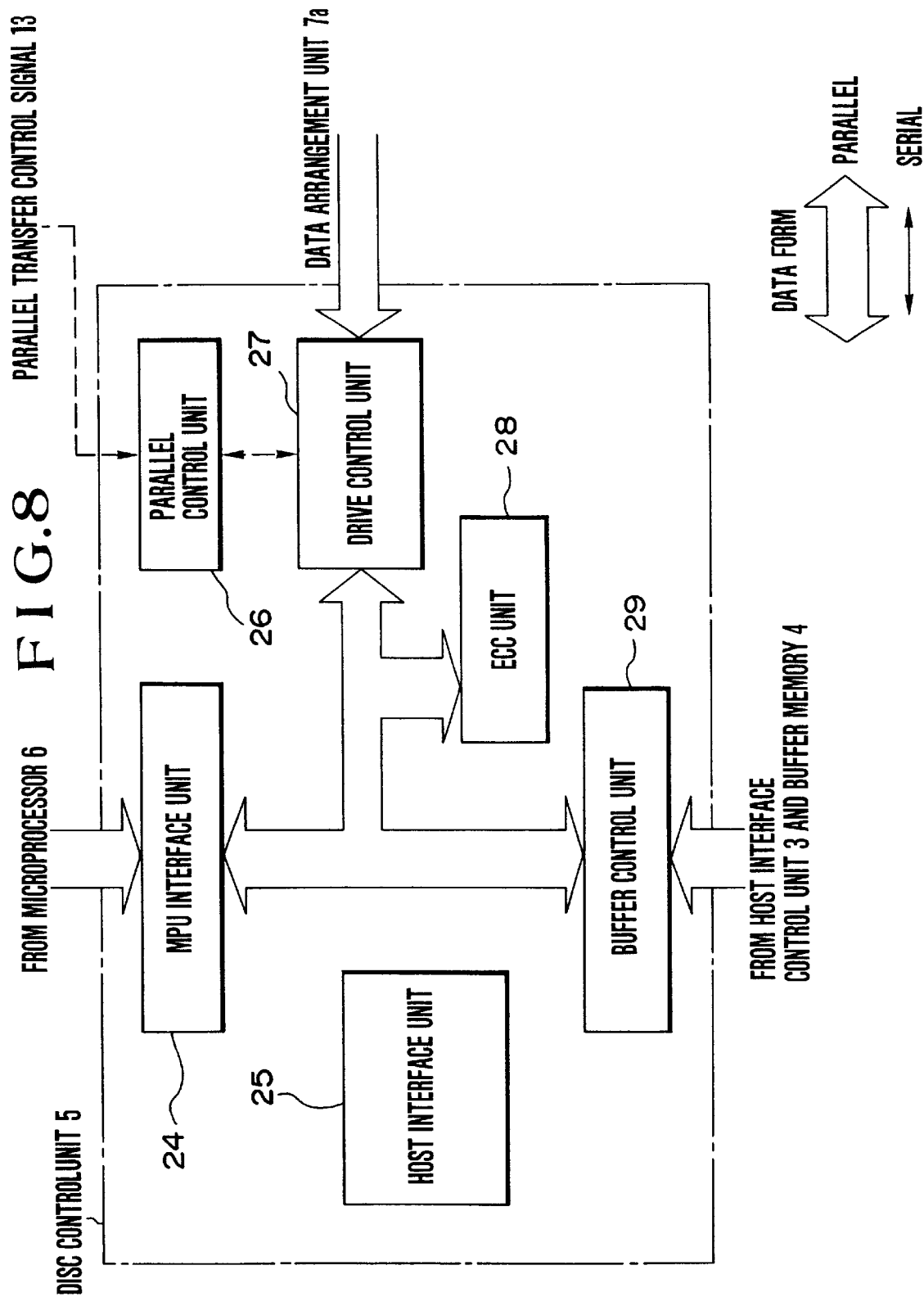
FIG. 8 is a block diagram showing a disc control unit in FIG. 1 in detail.

For controlling a transfer of such a parallel data train, the disc control unit 5 is provided with a parallel control unit 26 as shown in FIG. 8. It should be noted that, when data is read, the transfer direction is opposite to that in the data write operation.

When the ID 41 of each sector which is written without being divided is read, two equivalent IDs 41 are read, whereby even if either of the IDs 41 becomes defective and data cannot be read therefrom, it is possible to read the data from the other normal ID 41, which results in improving a reliability of the apparatus.

Figure 20:
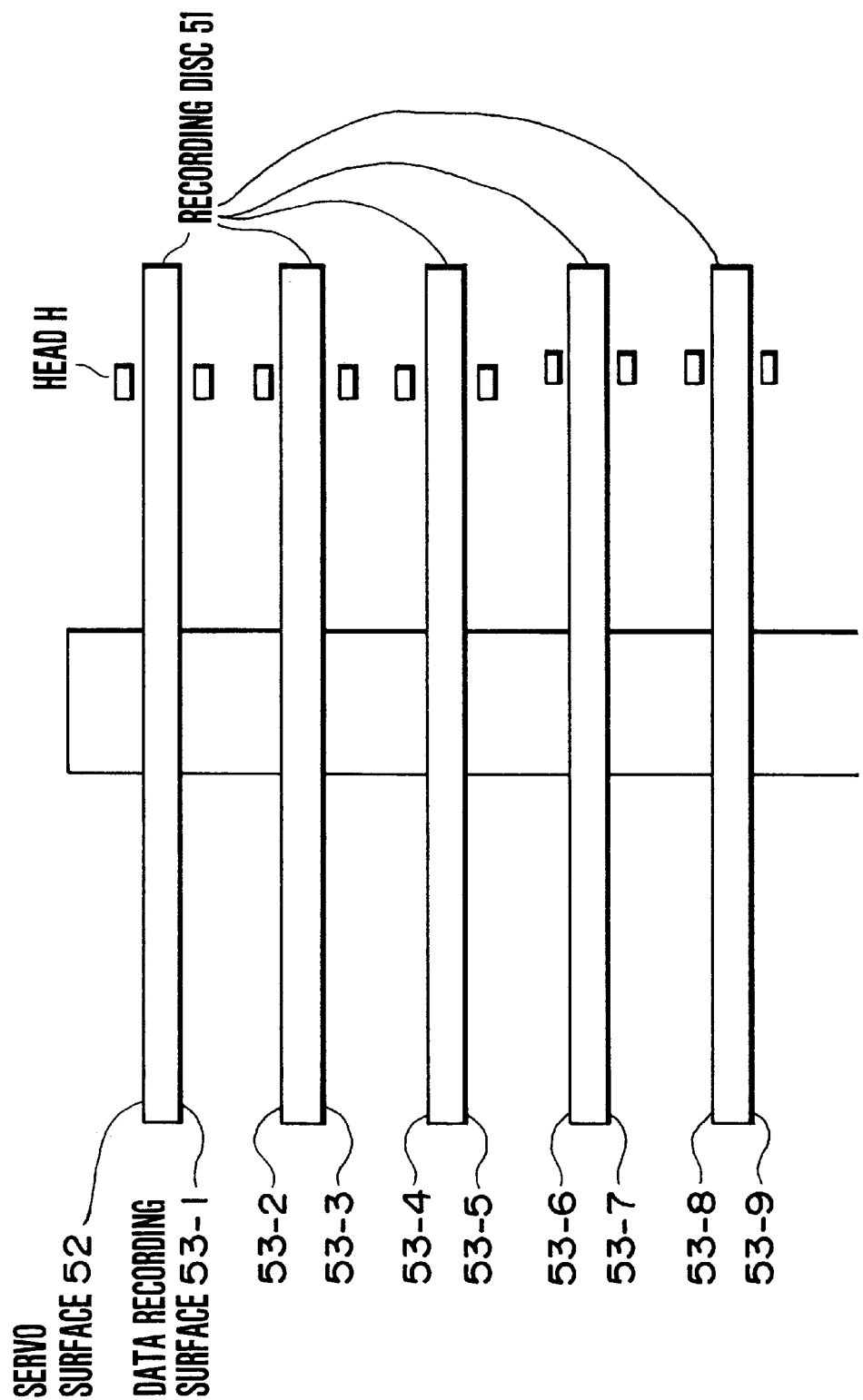
FIG. 20 is a lateral view showing a structure of magnetic discs and heads in the magnetic disc apparatus in FIG. 19.
Figure 21:
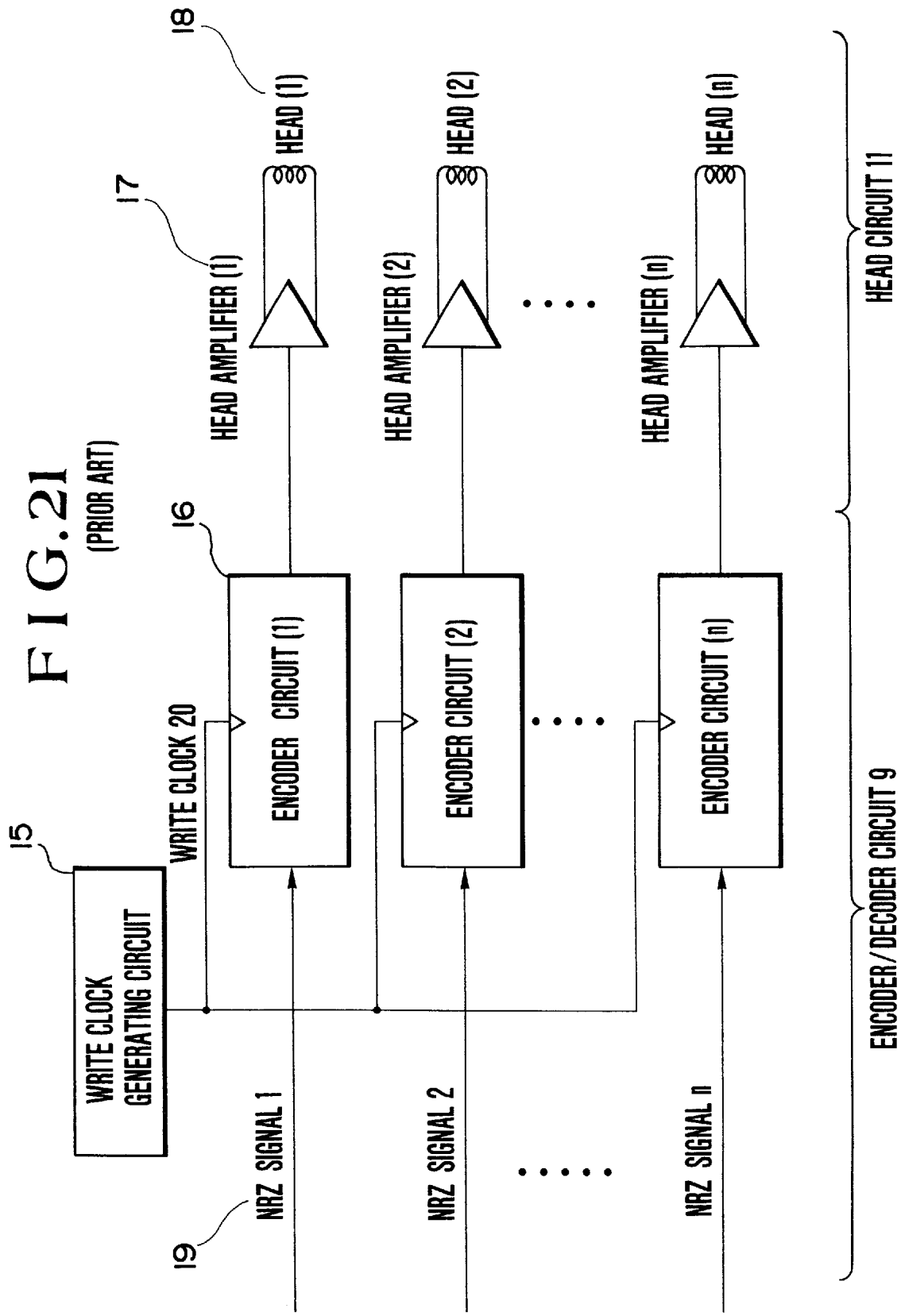
FIG. 21 is a block diagram showing in detail a recording and reproducing unit in FIG. 19 in a data write operation.
Figure 22:
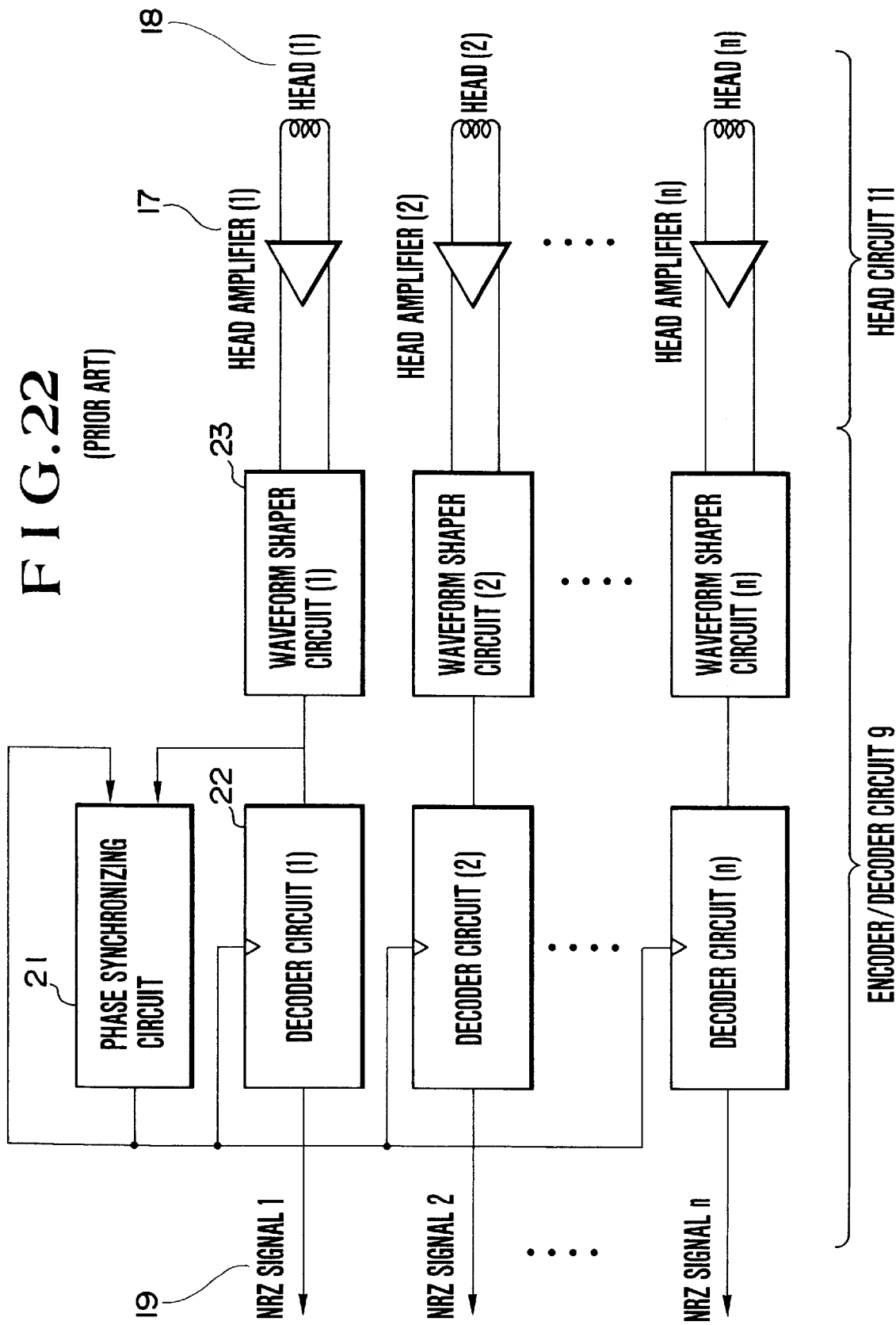
FIG. 22 is a block diagram showing in detail the recording and reproducing unit in FIG. 19 in a data read operation.
Figure 23:
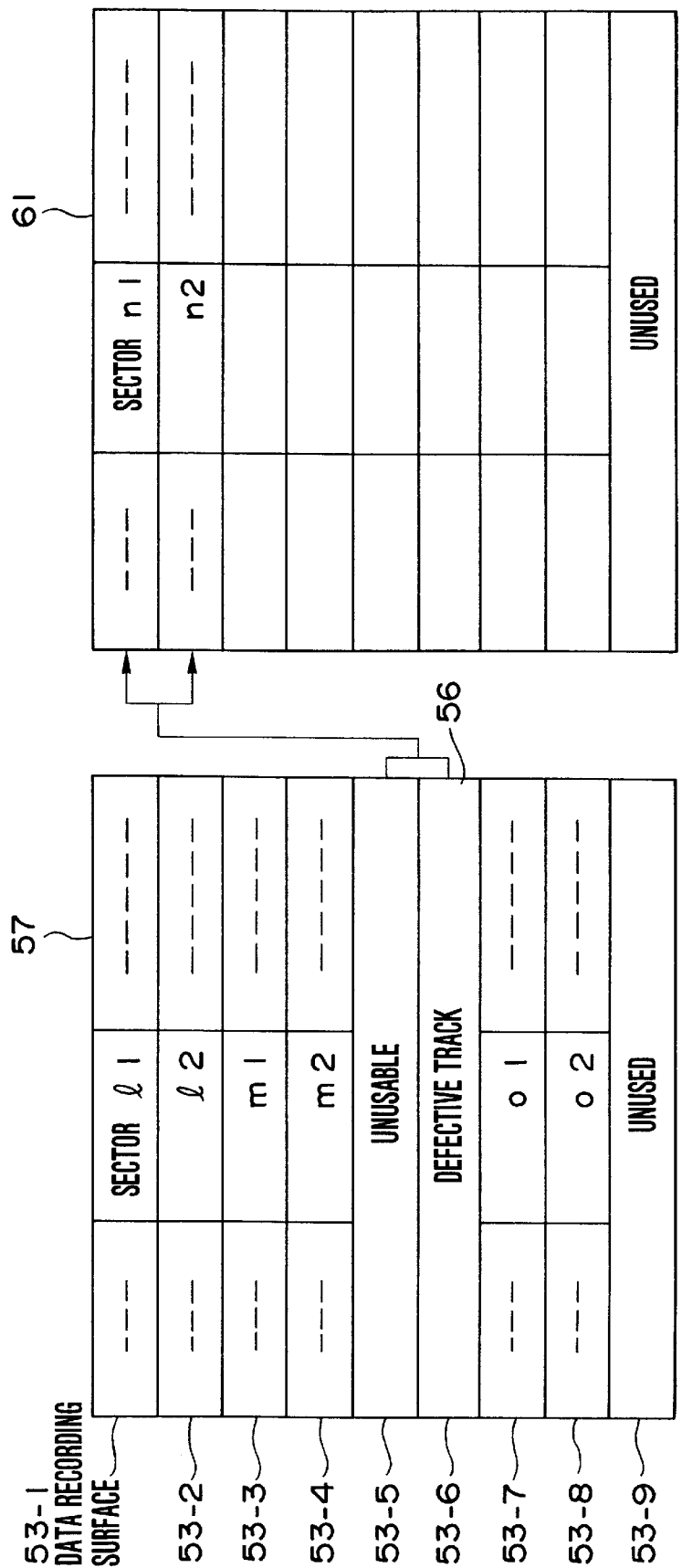
FIG. 23 is an explanatory diagram showing how a spare track is selected in place of a defective track on a data recording surface.
Figure 24:
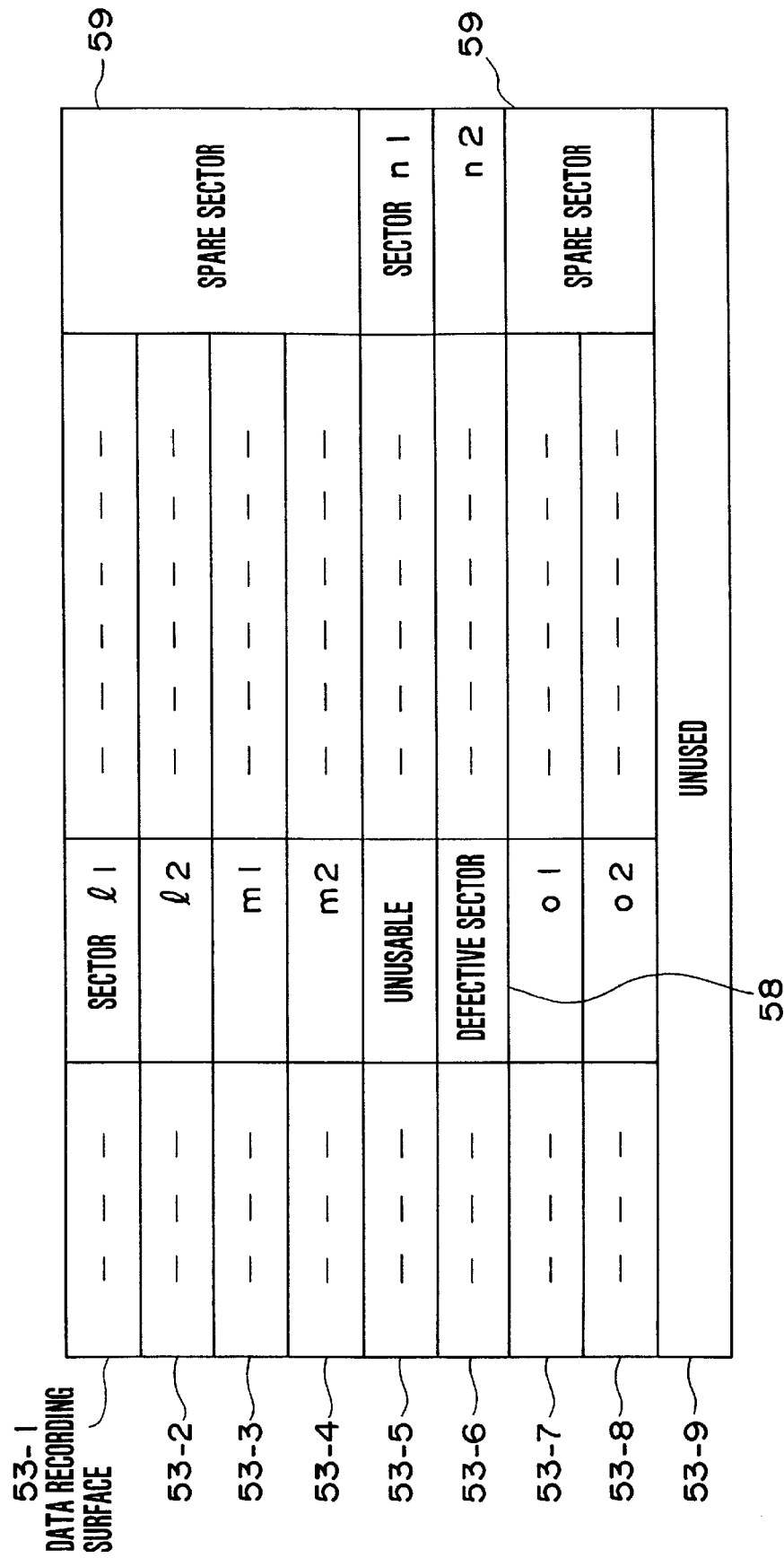
FIG. 24 is an explanatory diagram showing how a spare sector is selected in place of a defective sector on a data recording surface.

Next, operations of a disc format, data write and data read will be explained based on the structure of magnetic discs and heads in a magnetic storage apparatus shown in FIG. 20. This magnetic storage apparatus has five discs 51. Since this apparatus employs 1 dedicated servo system, one of the ten data recording surfaces serves as a servo surface, another one of them is reserved for a spare track or a spare sector, and the remaining eight surfaces are used for ordinary data train write and read operations. Ten heads 14 respectively correspond to the ten recording surfaces and are operated by actuators.

The non-divided ID 41 is also read by the operation of the parallel control unit 26 in the disc control unit 5. A number of data trains when the non-divided ID 41 is read by the parallel control unit 26 is indicated by a parallel transfer control signal 13 generated by the microprocessor 6.

Figure 18:
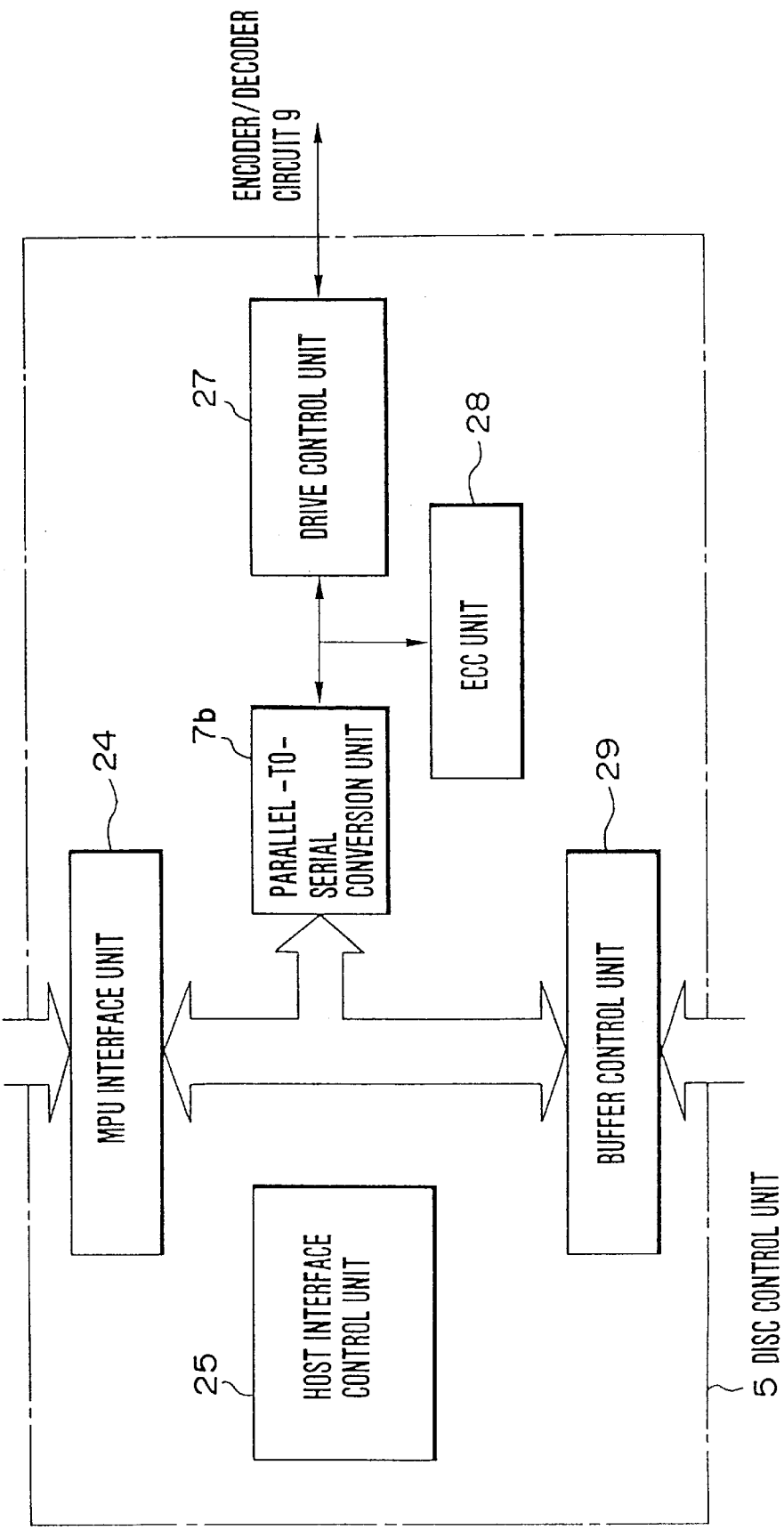
FIG. 18 is a block diagram showing a disc control unit in FIG. 17 in detail.
Figure 19:
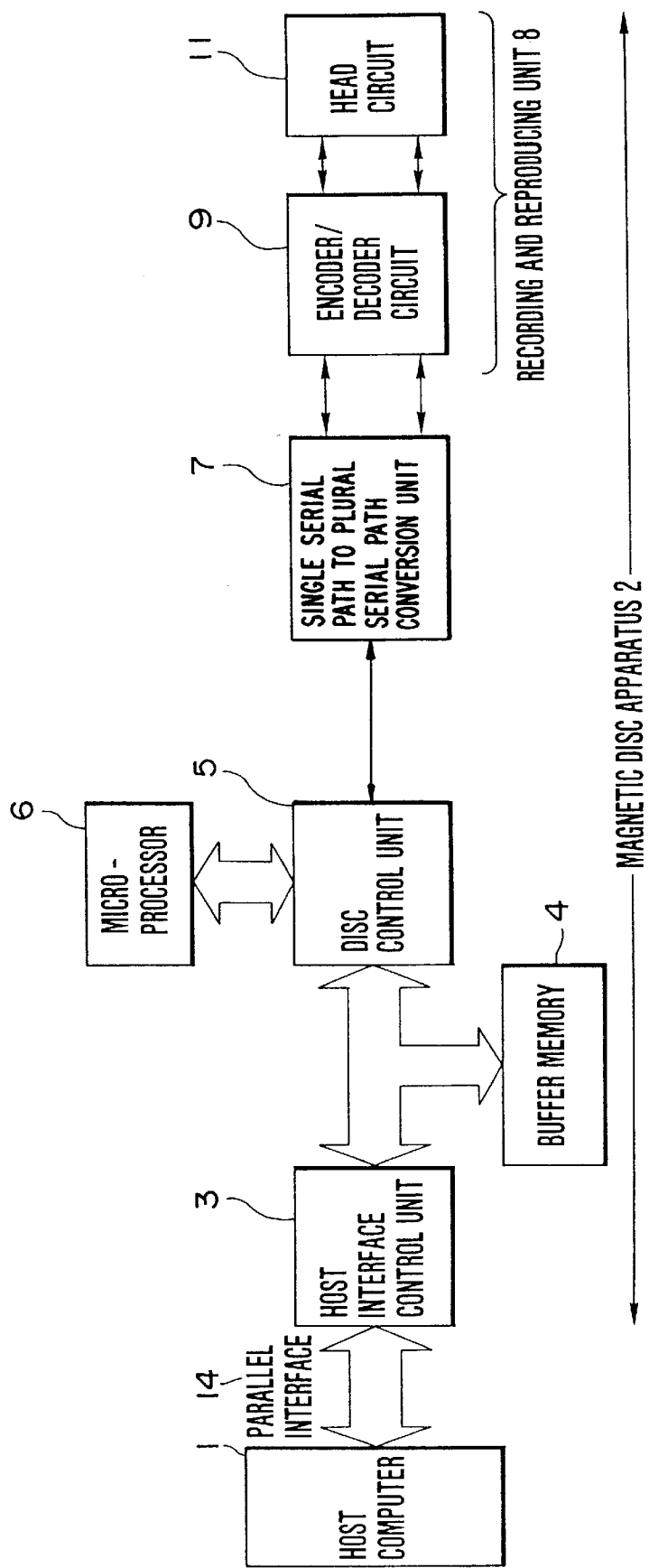
FIG. 19 is a block diagram showing a structure of a conventional parallel recording type magnetic disc apparatus.

Data is all treated as being parallel in the disc control unit 5 shown in FIG. 8. See FIG. 18 showing the disc control unit 5 of a conventional magnetic disc apparatus for the sake of comparison.

A sector formed on a track of a data recording surface is divided into two data trains which are simultaneously written on two data recording surfaces in a two-bit parallel method, and the written data trains are read therefrom.

(1) Disc Format

As previously explained, in FIG. 4 showing an example of a format (one sector is composed of 512 bytes) for the two-bit parallel recording, the only parallel data are the DATA 49 and the ECC 50 as mentioned above. It is, however, possible to arrange the ID 41 and the CRC 46 in a parallel form.

Nevertheless, it is desirable to write these data without being divided for improving the reliability of the apparatus. Specifically, by writing two equivalent ID fields in two data trains, even if either of the two equivalent ID fields cannot be read due to a defect in data write and read operations which require reading the ID field, the other ID field can be read, and therefore data can be written and read in and from the sector.

Further, since PLO·SYNC 39, BSP 40 of the ID field, and BSP 48 of the DATA field are used for synchronization when data is read by the recording and reproducing unit 8, as shown in FIG. 1, they cannot be divided into two data trains and written.

For this reason, it is necessary to independently store such information in respective sectors 37-1 and 37-2 constituting a sector 37. To fulfill a format, as shown in FIG. 4, composed of data (DATA 49, ECC 50 and so on) to be divided and data not to be divided (PLO·SYNC 39, BSP 40 of the ID field and BSP 48 of the DATA field), the parallel control unit 26 (FIG. 8) performs control such that the data to be divided is transferred as shown in FIG. 5 and the data not to be divided is transferred as shown in FIG. 7.

Next, a method of selecting two data recording surfaces for storing respective sectors at disc format will be explained.

As shown in FIG. 1, the microprocessor 6 calculates ID information of each sector from a sector number (n1, n2), delivers the calculated value to the disc control unit 5 for writing the same in the ID 41 and also delivers head information in the ID 41 to the head selection circuit 10 as the head selection signal 12.

The head information in this embodiment refers to numbers of heads corresponding to two data recording surfaces on which the sectors (n1, n2) are stored. When the head selection circuit 10 receives the head selection signal 12 representing the head information, it selects head numbers of the two data recording surfaces and actuates two of the corresponding heads 18. Thus, the respective sectors (n1, n2) are stored on the two data recording surfaces identical to the head information in the ID field 41.

The microprocessor 6, when a power supply for the whole system is turned on, generates a table including information on tracks and sectors on the basis of positional information on all defective tracks and sectors on the recording surfaces, the information being read from the data recording surfaces of the magnetic storage apparatus. Thus, the microprocessor 6 can previously recognize whether or not a defect exists in a position at which data is to be stored by searching for information on defective positions in the ID field 41 in the table generated by the microprocessor 6. If a defect exists on one of the two recording surfaces for storing the sectors, the microprocessor 6 delivers a defect signal (not shown) to both the disc control unit 5 and the head selection circuit 10.

When the disc control unit 5 receives the defect signal, it writes the defect information in a flag byte 45 when writing the ID information. Also, when the head selection circuit 10 receives the defect signal, it selects a head number of a previously prepared spare recording surface in place of a head number of the data recording surface including a defect.

Figure 9:
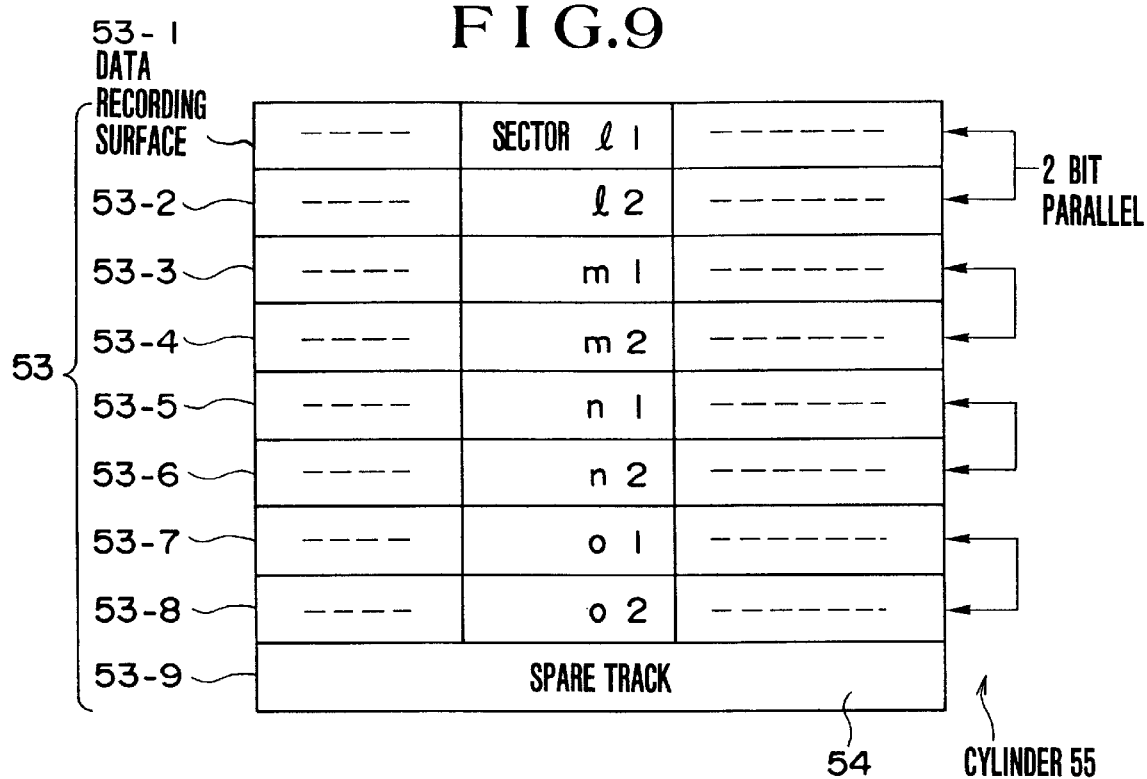
FIGS. 9 and 10 are explanatory diagrams showing how a spare track is selected in place of a defective track on a data recording surface.

Next, a structure of data trains on a recording surface selected by the above-mentioned operation will be explained with reference to FIGS. 9, 10 and 11. FIG. 9 shows tracks on data recording surfaces 53-1 to 53-9 on a cylinder 55 on which no defect exists. In this embodiment, the recording surfaces for the two-bit parallel recording are made by combinations of the data recording surfaces 53-1 and 53-2, 53-3 and 53-4, 53-5 and 53-6, and 53-7 and 53-8, and the data recording surface 53-9 is employed as a spare recording surface. However, if the microprocessor 6 utilizes a different calculation method for ID information, combinations other than the above-mentioned ones are naturally possible.

Figure 10:
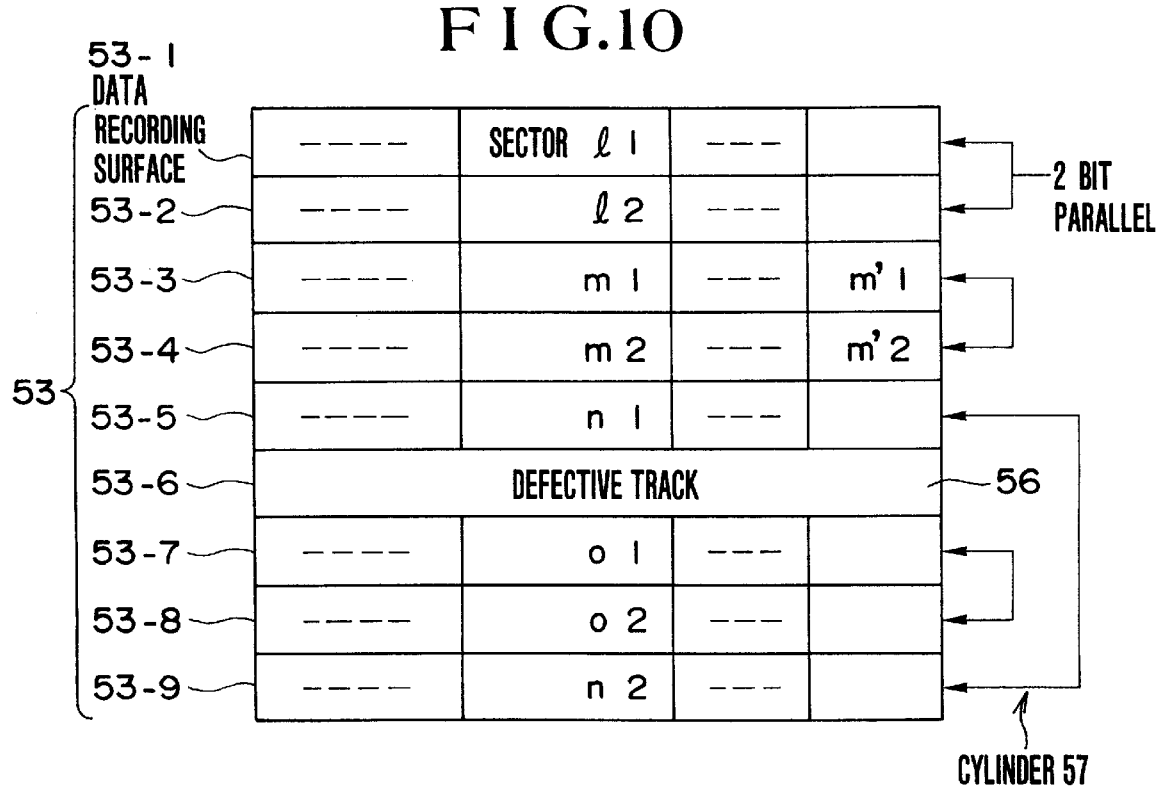
Figure 11:
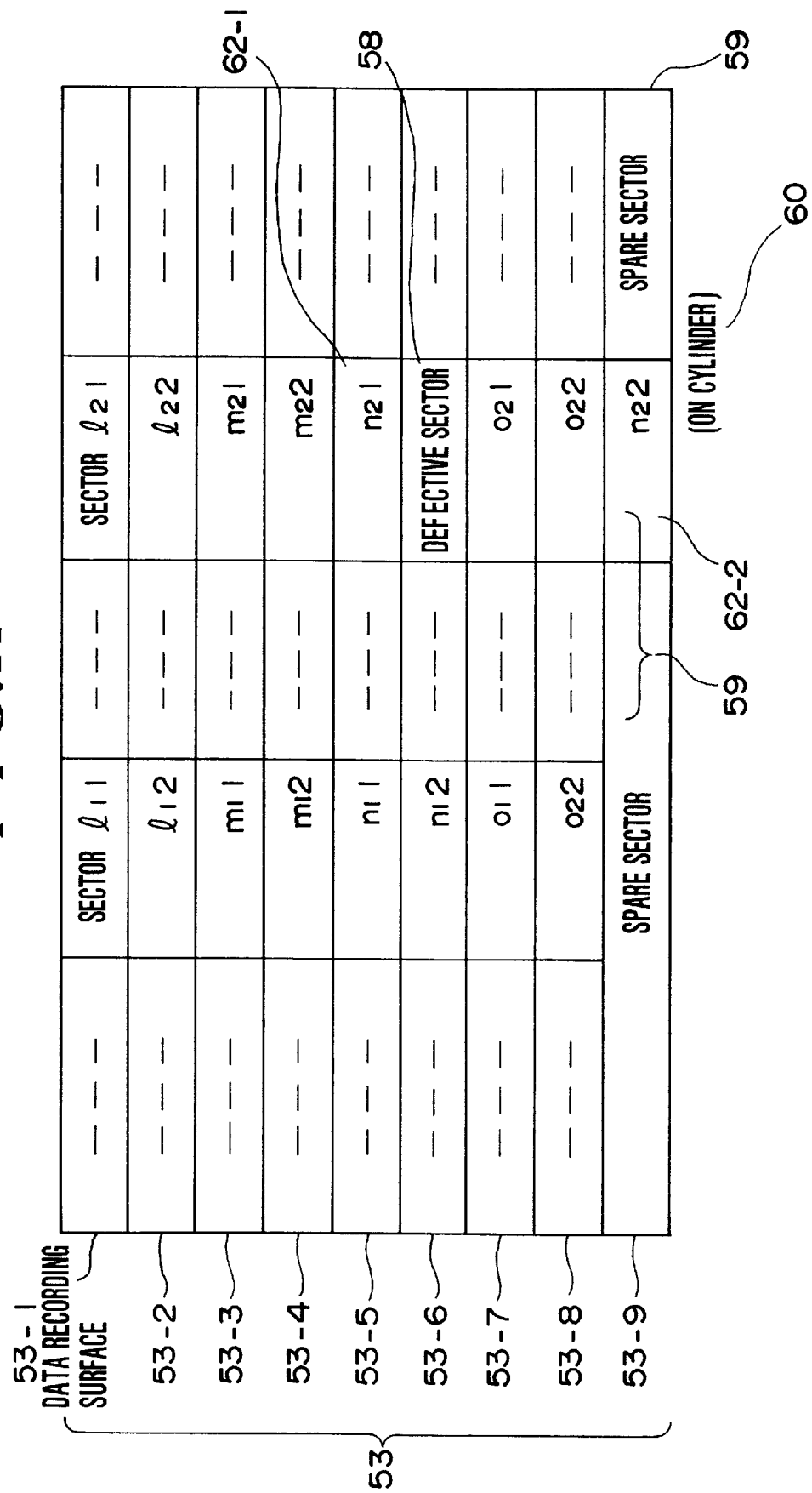
FIG. 11 is an explanatory diagram showing how a spare sector is selected in place of a defective sector on a data recording surface.

In the above combinations of the data recording surfaces 53, if a track on the data recording surface 53-6 on the cylinder 57 is a defective track 56 as shown in FIG. 10, since the microprocessor 6 previously recognizes that this track is defective, the head 18 on the spare data recording surface 53-9 is used in place of the head on the defective data recording surface 53-6 to be combined with the head 18 of the normal data recording surface 53-5 for formatting. A combination of the heads 18 can be readily made by changing combinations of a switching mechanism coupled to the respective heads 18 by a known technique.

FIGS. 9 and 10 show a case where the spare recording surface is used in the track unit. The spare recording surface can be likewise used in the sector unit, which is shown in FIG. 11. FIG. 11 shows a format of a combination of the head 18 of the data recording surface 53-5 with the head 18 of the spare data recording surface 53-9 which has been made since one of sectors on the data recording surface 53-6 combined with a sector 62-1 of the data recording surface 53-5 is defective. Sectors 62-1, 62-2 indicate respective two sectors divided from an ordinary sector. Basically, the sector should be divided into two sectors 62-1, 62-2 and stored on the data recording surfaces 53-5, 53-6. However, since the data recording surface 53-6 includes the defective sector 58, the sector 62-2 is stored on a spare sector 59 on the data recording surface 53-9 in place of the defective recording surface 53-6 by the microprocessor 6 which has recognized the existence of the defective sector 58. Thus, if a defective sector exists, the format is made in the above-mentioned manner.

However, the above explanation has been made on the assumption that defects existing on tracks in the same cylinder are all replaced with sectors belonging to the spare recording surface. Actually, it is quite rare that a plurality of defects exist on a single cylinder.

(2) Data Write Operation

A data write operation will hereinafter be explained.

Referring again to FIG. 1, when a data write command is delivered from the host computer 1 to the host interface control unit 3, the magnetic disc apparatus 2, in response to this command, positions the magnetic head 18 to a cylinder on which a target sector exists.

The microprocessor 6 calculates concerned ID information from sector numbers of all the data recording surfaces 53 of the magnetic storage apparatus, delivers the calculated values to the disc control unit 5, and delivers head information included in the ID information to the head selection circuit 10 as the head selection signal 12 to operate the head 18 to read the ID field 41 shown in FIG. 4.

In this event, even if a defect exists at a position indicated by the ID information calculated by the microprocessor 6, since the microprocessor has previously recognized the existence of the defect, it is possible to reassign to the head 18 on the spare recording surface before reading the ID field 41. Therefore, this reassignment operation does not require any time period.

The two fully identical ID information are converted to synchronized NRZ signals 19 (1 and 2) by the encoder/decoder circuit 9 (here n=2) shown in FIG. 3, delivered to the data arrangement unit 7a as shown in FIG. 7, and then supplied to the disc control unit 5 as parallel data.

As mentioned above, even if either of the two ID 41 cannot be read, it is possible to recognize the ID by reading the other correct ID 41. If the read ID information is confirmed to be that of the concerned sector, data to be written delivered from the host computer 1 is supplied from the disc control unit 5 to the data arrangement unit 7a through the buffer memory 4 as shown in FIG. 5. In the data arrangement 7a, the data is arranged to two data trains and encoded by the identical write clock 20 by the encoder/decoder circuit 9 shown in FIG. 2. Then, the two data trains are written on the data recording surface 53 by the use of two of the heads 18 selected by the head selection circuit 10.

The ECC 50 shown in FIG. 4 is generated by the ECC unit 28 shown in FIG. 8 and added behind the DATA 49.

(3) Data Read Operation

In a data read operation, two fully identical ID 41 are read by two corresponding heads operated by the ID information in the same procedure as the data write operation. If the read ID 41 is confirmed to be that of the concerned sector, data is read by the two corresponding heads 18, and the two data trains are decoded to the synchronized two-bit parallel NRZ signals 19 by the encoder/decoder circuit 9 shown in FIG. 3.

The division unit 7 receives these data trains and converts the same to an eight-bit parallel data train which in turn is delivered to the disc control unit 5.

The disc control unit 5 shown in FIG. 8 receives the data train, and an error detection is performed for the data train by the ECC unit 28. If an error is detected, the microprocessor 6 corrects the error based on error information from the ECC unit 28. If no error is detected, the data train is transferred to the buffer memory 4, and further transferred to the host computer 1 through the host interface control unit 3.

As described above, in a parallel recording type magnetic disc apparatus which divides a sector into n data trains and simultaneously writes and reads these divided respective data trains on and from n data recording surfaces, a plurality of recording surfaces for storing the divided data trains thereon can be selected by a microprocessor. Even if a defect exists on either one of the recording surfaces on which data cannot be stored, the data can be stored on a track or sector on a spare recording surface prepared on the same cylinder, thereby making it possible to effectively prevent a decrease in a storing capacity due to defective tracks or sectors which is remarkably important for a parallel recording.

The spare track and the spare sector are provided on the same cylinder as a defective track or a defective sector, and also a microprocessor built in the apparatus has previously recognized a defective area and reassigns to a track or a sector on the spare recording surface, so that it is possible to prevent a drop in a data transfer speed due to a reassignment operation.

The spare track or the spare sector formed on the spare recording surface are positioned on the same cylinder as a normal track or sector with which a pair is formed, however, the spare track or the spare sector may be formed on a different cylinder. In the latter case, a high speed data transfer is not considered to be an object to be achieved, and this formation is used for an emergency data save, backup, or the like.

Also, in the present embodiment, a coupling of a spare recording surface used in place of a recording surface including a defective track or a defective sector are made so as to form a pair with the two data recording surfaces, however, it is also possible to couple two or more normal data recording surfaces with a spare data recording surface.

Next, a magnetic disc apparatus of a second embodiment of the present invention will be explained.

Figure 12:
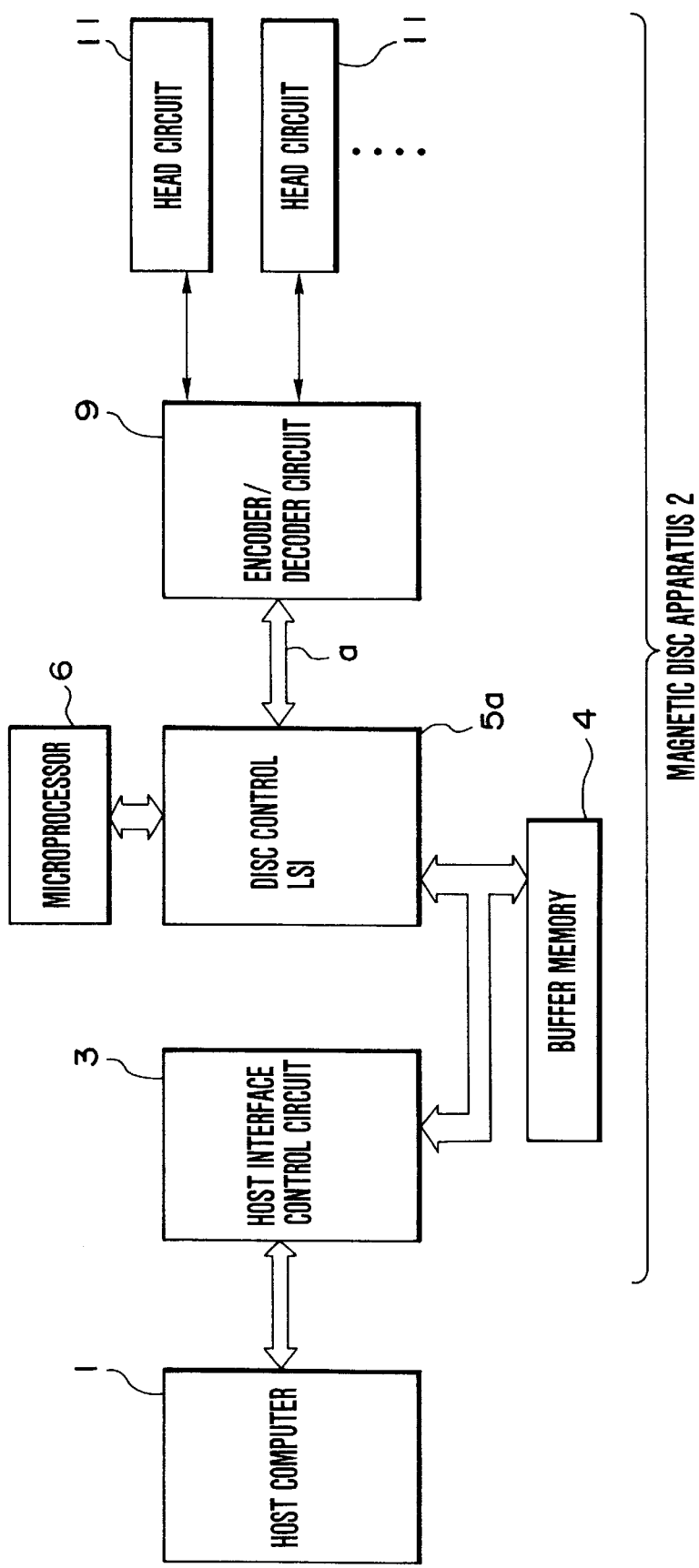
FIG. 12 is a block diagram showing a magnetic disc apparatus of a second embodiment of the present invention.

FIG. 12 shows a structure of a magnetic disc apparatus according to the present embodiment. Since the magnetic disc apparatus 2 shown in FIG. 12 includes the same structure as the magnetic disc apparatus 2 shown in FIG. 1, the same parts are designated the same reference numerals and a detailed explanation thereof will be omitted.

The magnetic disc apparatus 2 is provided with an encoder/decoder circuit 9 for encoding codes to be stored and decoding stored codes and a head circuit 11 for writing and reading data on and from a magnetic disc. The head circuit 11 is correspondingly connected with magnetic heads, each of which parallelly accesses a magnetic disc.

The magnetic disc apparatus 2 is also provided with a host interface control unit 3 for operating an interface with a host computer 1, an LSI 5a for disc control, later referred to, a buffer memory 4 for holding data transferred to and received from the host computer 1 and a microprocessor 6 for managing control of the whole system.

In an ordinary data write operation, the encoder/decoder circuit 9 and the head circuit 11 parallelly record parallel data received from the disc control LSI 5a on a plurality of sectors 37-1, 37-2 on a formatted disc.

In this event, it is necessary, in general, to encode data to be recorded on a disc to recording codes. However, in the present embodiment, the encoder/decoder 9 receives parallel data as it is from the disc control LSI 5a and encodes the same in parallel (there are actually known many recording codes, such as 2-7 RLL code, 1-7 RLL code or the like, which can be converted to a parallel form by a simpler circuit arrangement). Also, recorded codes read from a disc are decoded by the encoder/decoder circuit 9.

The encoder/decoder circuit 9 may comprise the same number of encoder/decoder circuits as that of output data lines of the disc control LSI 5a.

As mentioned above, the magnetic disc apparatus 2 according to the present invention parallelly stores data on magnetic discs, wherein the encoder/decoder circuit 9 is connected to the disc control LSI 5a through a bus a for parallelly receiving and delivering data.

Internal Structure of Disc Control LSI

Next, the disc control LSI 5a according to the present embodiment will be explained on the basis of FIG. 13.

The disc control LSI 5a is composed of a CPU interface unit 100, a buffer control unit 101, a host interface control unit 102, a drive control unit 103, a format control unit 104 and an ECC unit 105.

The CPU interface unit 100, which serves as an interface between the external microprocessor 6 and the LSI 5a, controls transfer of data and addresses between the microprocessor 6 and the LSI 5a.

The buffer control unit 101 is adapted to control the buffer memory 4 provided for offsetting the difference in a data transfer speed between a magnetic storage apparatus (not shown) and the host computer 1. Data transfer operations between the magnetic storage apparatus and the host computer 1 are all performed through this buffer memory 4.

The host interface control unit 102 is adapted to control data transfer between the disc control LSI 5a and the host interface control circuit 3, and handle signals between the host interface control circuit 3 and the disc control LSI 5a.

The ECC unit 105 is adapted to generate and decode an error correcting code for correcting data errors produced due to noise, a defect on a recording medium, or the like when data delivered from the host computer 1 is written in the magnetic storage apparatus. Conventionally, a Fire code has been generally employed for an error correcting code for hard disc drive units. However, if a decoder circuit is implemented by hard logic, the Fire code requires that data be in a serial form, so that data may not remain parallel. For this reason, the present invention employs a Reed-Solomon code as described, for example, in Japanese Patent Application Laid-Open Publication No. 1-264316 corresponding to Japanese Patent Application No. 63-91418 or the like, to permit parallel data processing.

The drive control unit 103 is adapted to control a transfer between the disc control LSI 5a and the encoder/decoder circuit 9 and comprises a format control unit 104.

The format control unit 104 is provided for controlling a format for writing sector management information necessary for writing and reading data and a synchronizing signal and so on used by the head circuit when data is read. A disc apparatus, when used for the first time, needs to be formatted. When data delivered from the host computer 1 is written into the magnetic storage apparatus, it is necessary to add an error correcting code 50 generated by the ECC unit 105 and other information in a data area to a data train 49 before writing. This addition of information is also performed by the format control unit 104.

Next, a feature of the structure of the disc control LSI of the present embodiment will be described in comparison with a conventional disc control LSI which serially stores data.

Figure 14:
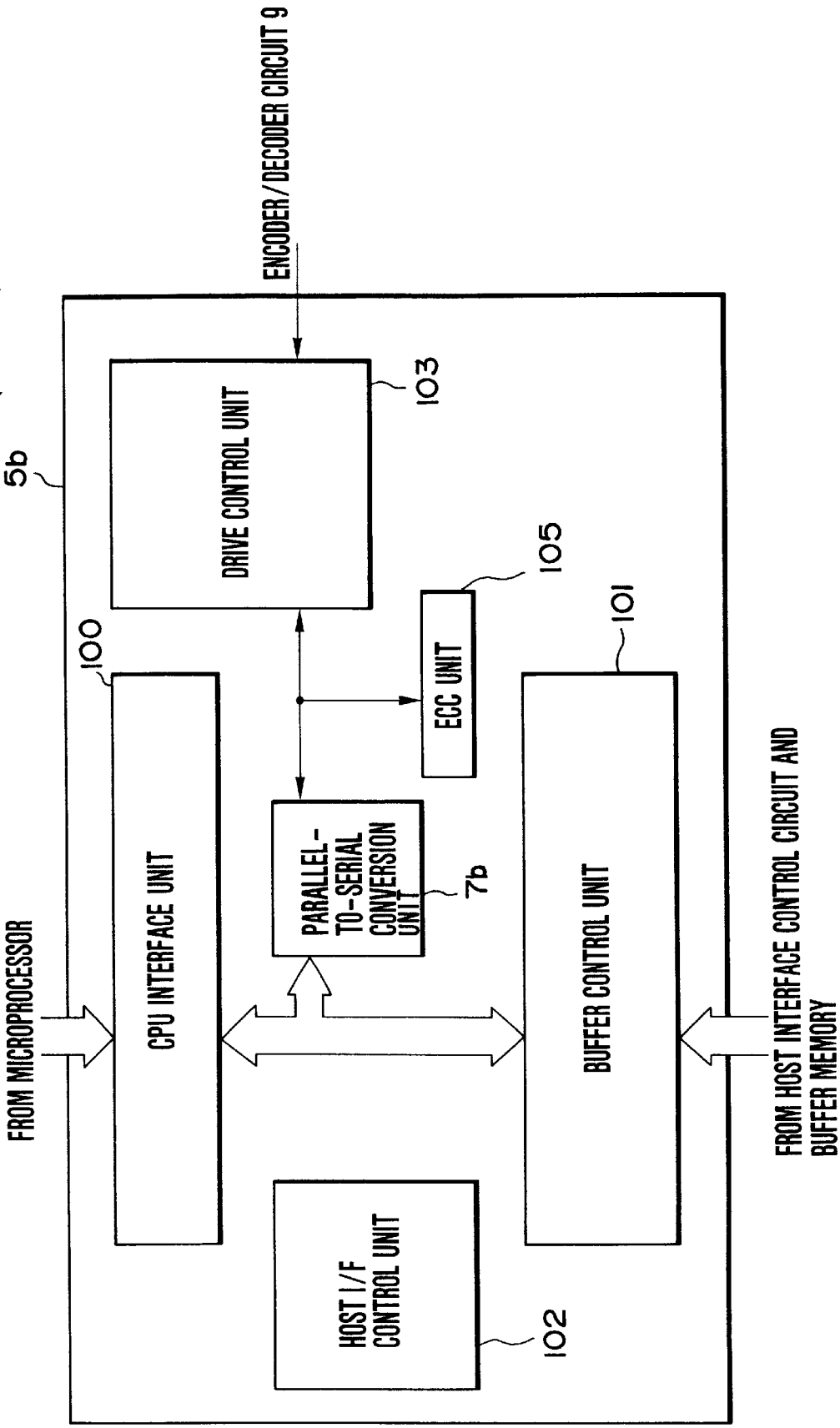
FIG. 14 is a block diagram showing a structure of a conventional disc control LSI.

FIG. 14 shows a structure of a conventional disc control LSI 5b. As shown in the drawing, data in a CPU interface 100 and a buffer control unit 101 has been handled in parallel form. However, an ECC unit 105 is constructed so as to handle serial data. Therefore, the data in parallel form is converted to serial data by a parallel-to-serial conversion unit 7b, an error correcting code is generated for the serial data by the ECC unit 105, and then the serial data with the error correcting code is delivered to a drive control unit 103.

Figure 13:
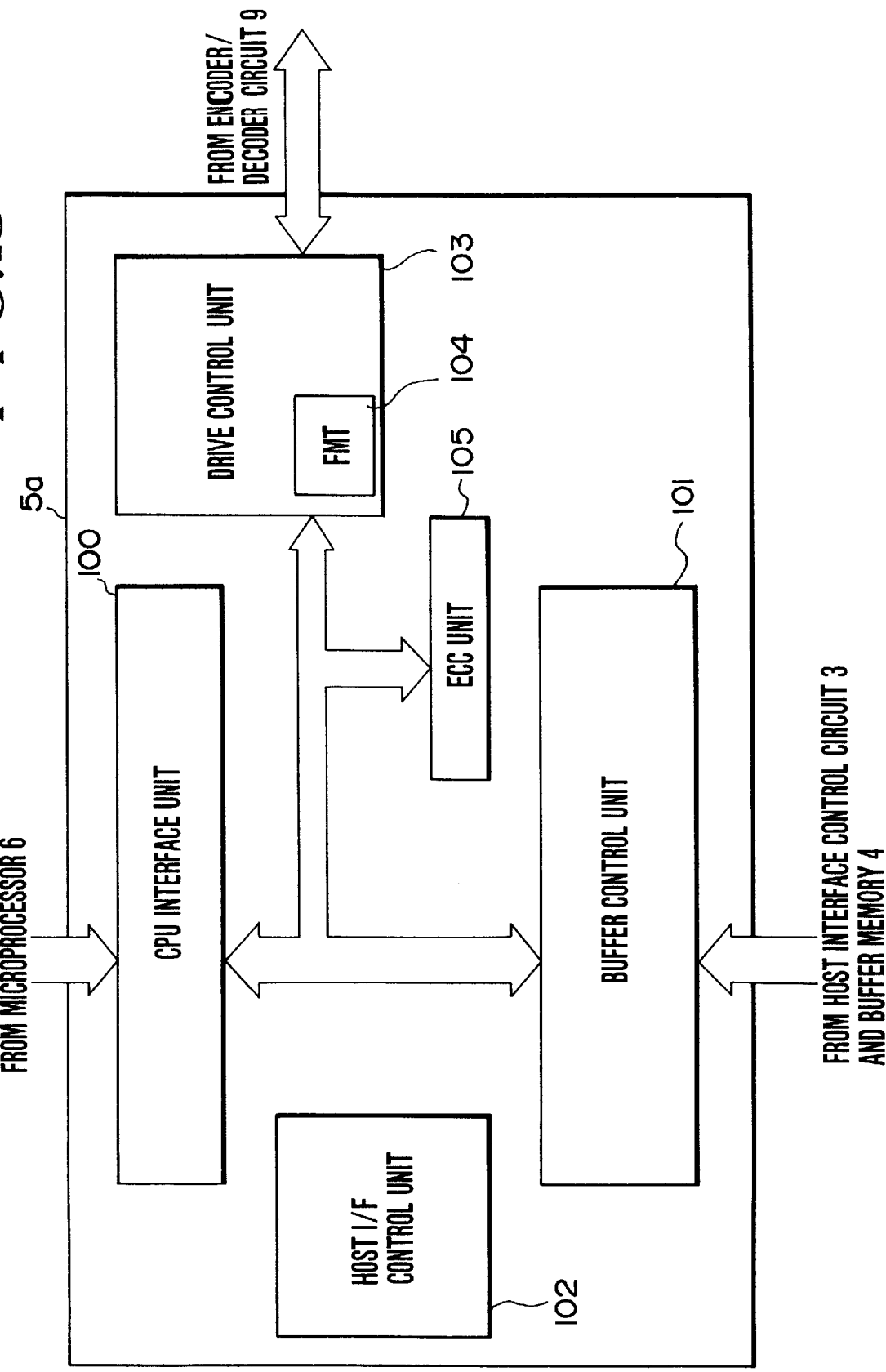
FIG. 13 is a block diagram showing a structure of a disc control LSI.

On the other hand, the disc control LSI 5a according to the present embodiment shown in FIG. 13 employs the aforementioned Reed-Solomon code in the ECC unit 105 so as to handle parallel data as it is.

The drive control unit 103 is also constructed to handle parallel data to allow the whole LSI 5a to operate on parallel data.

Even if the ECC unit 105 is constructed as before and the drive control unit 103 is provided with a serial-to-parallel conversion unit to output parallel data therefrom, a data processing speed can be improved to some extent. As to a transfer within the LSI 5a, a serial transfer also provides a high speed data transfer to some degree by increasing a transfer speed, whereas, it is difficult for a serial data transfer to increase a speed for transferring data to the outside of the LSI 5a. Specifically, it is highly possible that an effective data processing speed of the whole system may be determined by a data transfer speed to the outside of the LSI 5a. For this reason, a parallel data transfer to the outside of the LSI 5a leads to increase an overall data processing speed.

Next, an internal structure of the format control unit 104 will be explained.

Figure 15:
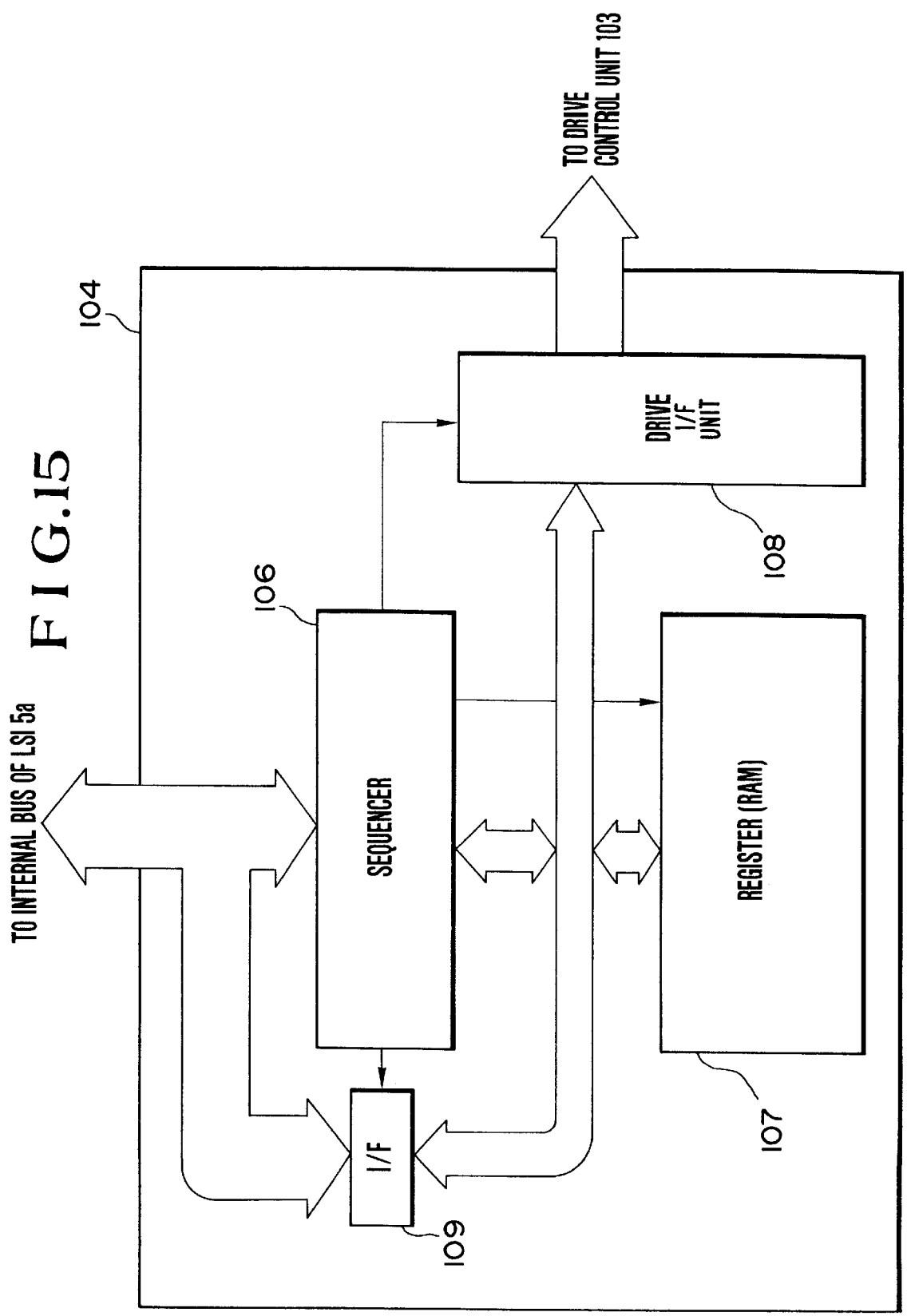
FIG. 15 is a block diagram showing a detailed structure of a format control unit in FIG. 13.

FIG. 15 shows a structure of the format control unit 104.

In the drawing, reference numeral 106 designates a sequencer for decoding instructions from the microprocessor 6 (see FIG. 12) and controlling respective units, 107 a register for storing a gap 38 (see FIG. 4) for format, a variety of synchronizing patterns and so on, 108 a drive interface unit for performing a parallel-to-serial conversion and an output operation of data, and 109 an interface between the LSI 5a, the sequencer 106 and the drive interface unit 108.

Figure 16:
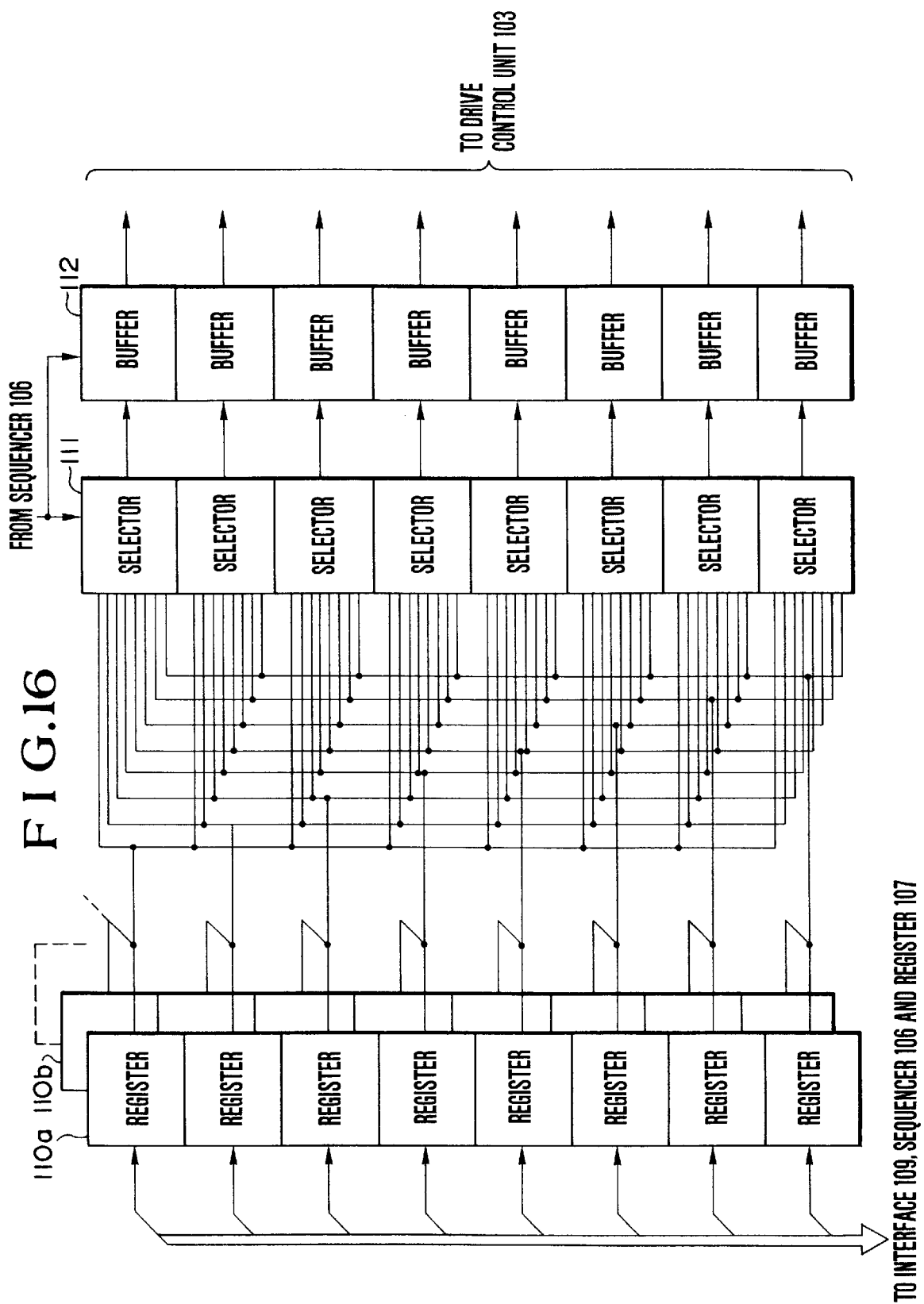
FIG. 16 is a block diagram showing a detailed structure of a drive interface in FIG. 15.
Figure 17:
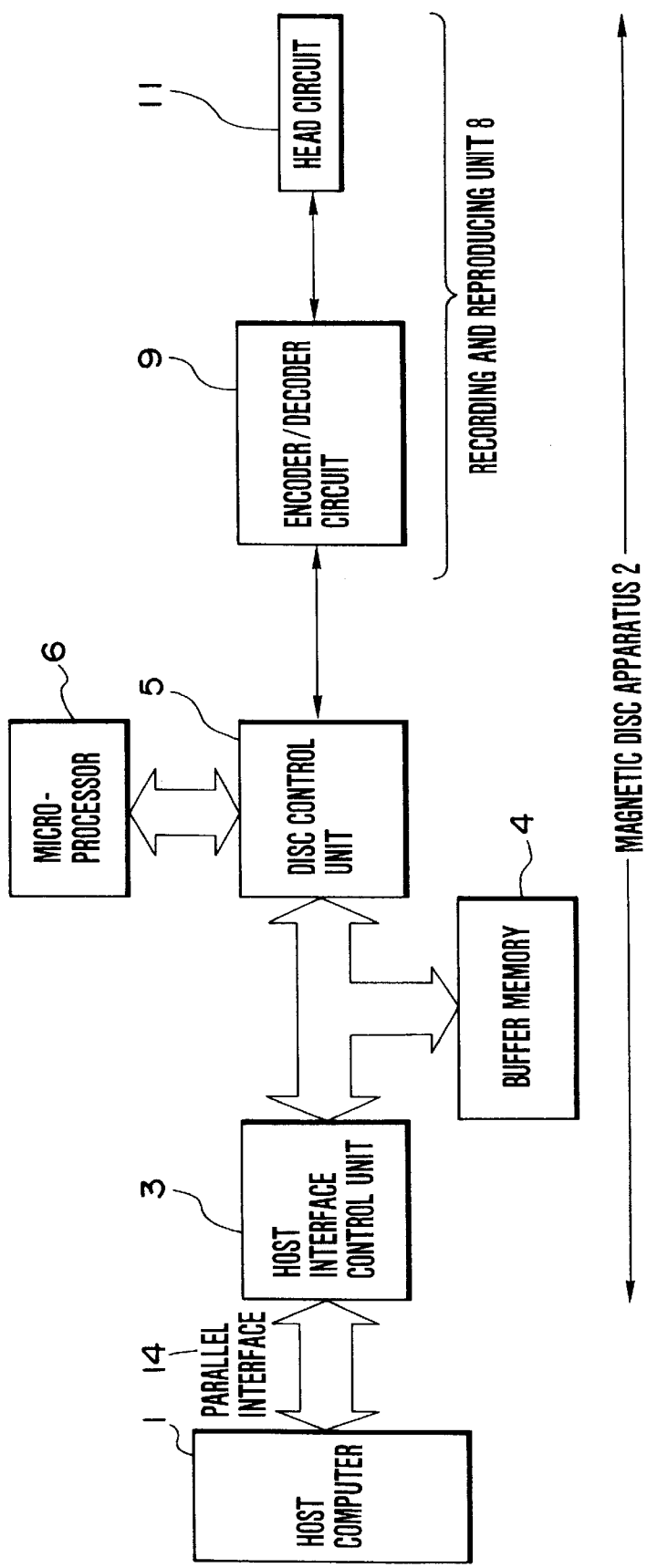
FIG. 17 is a block diagram showing a structure of a conventional serial recording type magnetic disc apparatus.

FIG. 16 shows a structure of the drive interface unit 108. In the drawing, reference numerals 110a, 110b designate registers for storing data to be written, 111 a selector for performing a parallel-to-serial data conversion for data to be written, and 112 a buffer for outputting data selected by the selector 111.

Next, a formatting operation performed by the format control unit 104 will be explained.

First, the micro processor 6 instructs the sequencer 106 of storing gap 38 for formatting, addresses, a variety of synchronizing patterns and so on in the register 107. The microprocessor next instructs the sequencer 106 of executing a formatting.

The sequencer 106, upon receiving this instruction, transfers the above-mentioned gap 38, addresses, various synchronizing patterns and so on from the register 107 to the drive interface unit 108.

The drive interface unit 108 outputs these data to the magnetic storage apparatus. In this event, it is necessary to add gap 38 and the various synchronizing patterns to respective sectors, so that each bit of inputted data is sequentially selected and outputted by a bit selection performed by the selector 111 to thereby convert the data from the register 107 in a serial form and output this serial data.

By the above-mentioned operations, gap 38 and the various synchronizing patterns can be added to respective sectors. Ordinary stored data can be stored in a parallel form by outputting the same without a parallel-to-serial conversion.

In place of a parallel-to-serial conversion, the microprocessor 6 may previously store a plurality of data in the register 107 such that a train of bits in respective digits constitutes desired data.

Next, the ordinary operation of the magnetic disc apparatus 2 will be explained.

Data Write Operation

The host computer 1 delivers a write command to the host interface control circuit 3 through a SCSI interface (Small Computer System Interface) or the like.

The head circuit 11 receives the command through the host interface control circuit 3, the disc control LSI 5a and the encoder/decoder circuit 9 and positions the magnetic head 18 on a target sector in accordance with the command.

Then, the host computer 1 delivers data to be stored. The data is assumed to be parallel data having a one-byte length. The data to be stored is transferred from the host interface control circuit 3 to the buffer memory 4 and further to the disc control LSI 5a by the buffer control unit 101 of the disc control LSI 5a.

The ECC unit 105 arranged in the disc control LSI 5a adds a Reed-Solomon code or an error correcting code to this data and transfers the data including the error correcting code to the encoder/decoder circuit 9 as one-byte parallel data.

The encoder/decoder circuit 9 converts the parallel data to a recording code such as a 1-7 code or the like and writes each bit of the data on sectors 37-1, 37-2 on a disc corresponding to addresses specified by the write command by a head circuit 11 having a plurality of head assemblies.

Data Read Operation

The host computer 1 delivers a read command to the host interface control circuit 3 through a SCSI interface or the like. The head circuit 11 receives this command through the host interface unit 3 and positions the magnetic heads 18 to sectors 37-1, 37-2 corresponding to data addresses specified by the command.

Then, data is simultaneously read from the plurality of sectors 37-1, 37-2 by the head circuit 11 respectively corresponding to these magnetic heads 18. A data skew between the respective head circuits 11 is compensated for by the encoder/decoder circuit 9, and then the read data is decoded to a parallel NRZ signal. The disc control LSI 5a receives this parallel data, and an error detection is performed by the ECC unit 105. If errors are found, they are corrected by the micro-processor 6 on the basis of error information from the ECC unit 105. If there is no error, the data is transferred to the buffer memory 4 and further to the host computer 1 through the host interface control circuit 3.

As described above, according to the present embodiment, it is possible to form parallel data paths in the whole magnetic disc control apparatus, which results in increasing a data transfer speed by the number of parallel data lines of the bus, in principle, compared with a conventional disc control apparatus which includes serial data paths.

Further, according to the present embodiment, only one of the disc control LSI 5a is required, which is advantageous in that a low cost and a small mounting area occupied by the LSI 5a are also achieved. Also, the microprocessor 6 does not have to execute a complicated processing.

In the above embodiment, a parallel data transfer information processing system is fulfilled by coupling the magnetic disc apparatus 2 and the host computer 1.

It should be noted that the disc control LSI 5a may be used for an optical or magneto-optical disc apparatus, in addition to the magnetic disc apparatus 2, to fulfill an information processing system for increasing a data transfer speed.

As described above, it is possible to increase a data transfer speed of a magnetic disc apparatus merely by employing a single disc control LSI.

It is also possible to provide an information processing system employing a disc apparatus which can increase a data transfer speed.

What is claimed is:

1. A data processing method of recording data on a recording medium mounted on an information recording apparatus, the data processing method comprising the steps of:

dividing, in a disk controller, parallel data constituted by p bits transferred from a high-rank device into data each having q bits, where p and q are numbers;

transferring the data each having q bits from the disk controller to an encoder as parallel data constituted by q bits;

encoding, in the encoder, the data each having q bits to generate recording signals corresponding to data to be recorded; and recording the recording signals on the recording medium, thereby recording the data to be recorded on the recording medium.

2. A data processing method according to claim 1, further comprising the steps of:

reproducing, from the recording medium, the recording signals recorded on the recording medium;

decoding, in a decoder, the reproduced recorded signals to generate data each having p bits;

transferring the data each having p bits from the decoder to the disk controller as parallel data constituted by p bits; and converting, in the disk controller, the data each having p bits into parallel data constituted by m bits to be transferred to the high-rank device, where m is a number.

3. A data processing method according to claim 2, wherein p and m are different numbers.

4. A data processing method according to claim 1, wherein p and q are different numbers.

5. A data processing method of reproducing data recorded on a recording medium mounted on an information reproducing apparatus, the data processing method comprising the steps of:

reproducing, from the recording medium, recorded signals corresponding to data recorded on the recording medium;

decoding, in a decoder, the reproduced recorded signals to generate data each having p bits, where p is a number;

transferring the data each having p bits from the decoder to a disk controller as parallel data constituted by p bits; and converting, in the disk controller, the data constituted by p bits into parallel data constituted by m bits to be transferred to a high-rank device, where m is a number.

6. A data processing method according to claim 5, wherein p and m are different numbers.

* * * * *